US012700152B2

(12) United States Patent
Li et al.

(10) Patent No.: US 12,700,152 B2
(45) Date of Patent: Aug. 4, 2026

(54) AI-BASED AVATAR CREATION USING STYLE TRANSFER AND SUBJECT IMAGES

(71) Applicant: Microsoft Technology Licensing, LLC, Redmond, WA (US)

(72) Inventors: Ji Li, San Jose, CA (US); Fatima Zohra Daha, Livemore, CA (US); Mingxi Cheng, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 18/595,555

(22) Filed: Mar. 5, 2024

(65) Prior Publication Data

US 2025/0285343 A1     Sep. 11, 2025

(51) Int. Cl.
*G09G 5/00*          (2006.01)
*G06T 11/60*         (2006.01)

(52) U.S. Cl.
CPC .......... *G06T 11/60* (2013.01); *G06T 2200/24* (2013.01)

(58) Field of Classification Search
CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06T 2200/24; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40;

G06V 20/20; G06V 10/7753; G11B 27/10; H04N 21/47217; G16H 30/20; G06N 20/20; G06N 3/045; G06N 3/047; G06N 3/08; G06Q 30/0643
USPC ......................................................... 345/619
See application file for complete search history.

(56)                References Cited

U.S. PATENT DOCUMENTS

2015/0178786 A1*   6/2015  Claessens .......... G06Q 30/0277
                                                            705/14.66
2023/0401673 A1*  12/2023  Gupte ..................... G06T 17/20
2024/0295953 A1*   9/2024  Zakharov ............... G06V 10/82
2024/0404225 A1*  12/2024  Ghosh ........................ G06T 7/74
2025/0078349 A1*   3/2025  Cho ......................... G06T 11/60
2025/0139379 A1*   5/2025  Jain ........................ G06F 16/483

* cited by examiner

*Primary Examiner* — Gordon G Liu
(74) *Attorney, Agent, or Firm* — NovoTechIP International PLLC

(57)                ABSTRACT

A data processing system implements receiving a style request including a style image and image(s) of subject(s) for generating an avatar for the subject(s); constructing a first prompt by appending the style request and the image(s) to a first instruction string, the first instruction string including instructions to a multimodal model to generate a textual description of the subject(s) from the image(s), to generate a textual description of a style from the style image, and to construct a second prompt including instructions to a text-to-image model to create the avatar for the subject(s) in the style based on the textual descriptions; providing the first prompt to the multimodal model and receiving the second prompt; providing the second prompt to the text-to-image model and receiving the avatar; providing the avatar to the client device; and causing the user interface of the client device to display the avatar.

20 Claims, 13 Drawing Sheets

Subject + Style Transfer + (optional Objects)
User Subject Request 150
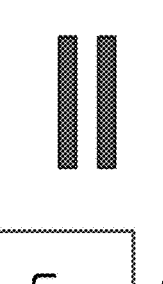
Subject Image 150a -> Subject Textural Description 150b
+
User Style Request 152
Flat design style
Text 152a
or
Image 152b -> Text 152c
=
Avatar 154
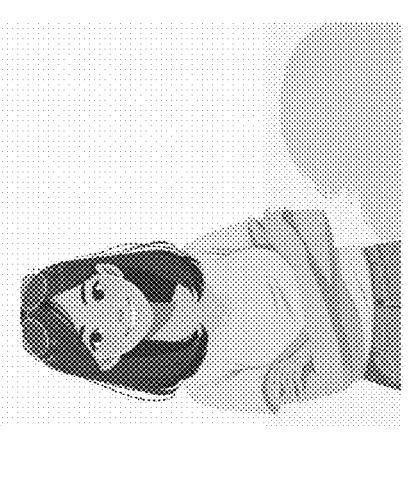
User Object Request 153
Birthday cake and balloons
Text 153a
or
Image 153b -> Text 153c
+
Avatar with flat design style 154a
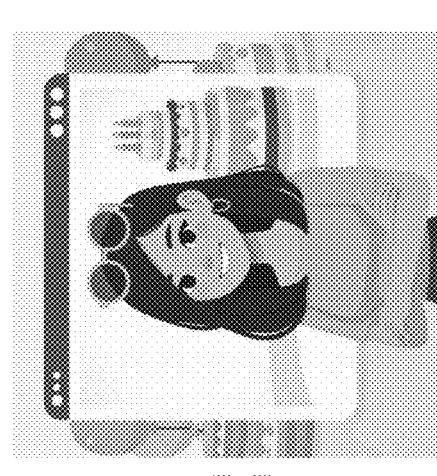
Avatar with flat design style & objects 154b
FIG. 1B

Subjects + Style Transfer + (optional Objects)

User Subject Request 150

Subject Images 150a & 150c ->
Subject Textural Description
150d

+

User Style Request 152

Christmas
themed flat
design style

Text 152d
or
Image 152e -> Text 152f

Avatar 154

User Object Request 153

Birthday
cake
and
balloons

Text 153a
or
Image 153b -> Text 153c

+

Avatar with Christmas theme flat
design style 154c

Avatar with Christmas theme flat
design style & objects 154d

FIG. 1C

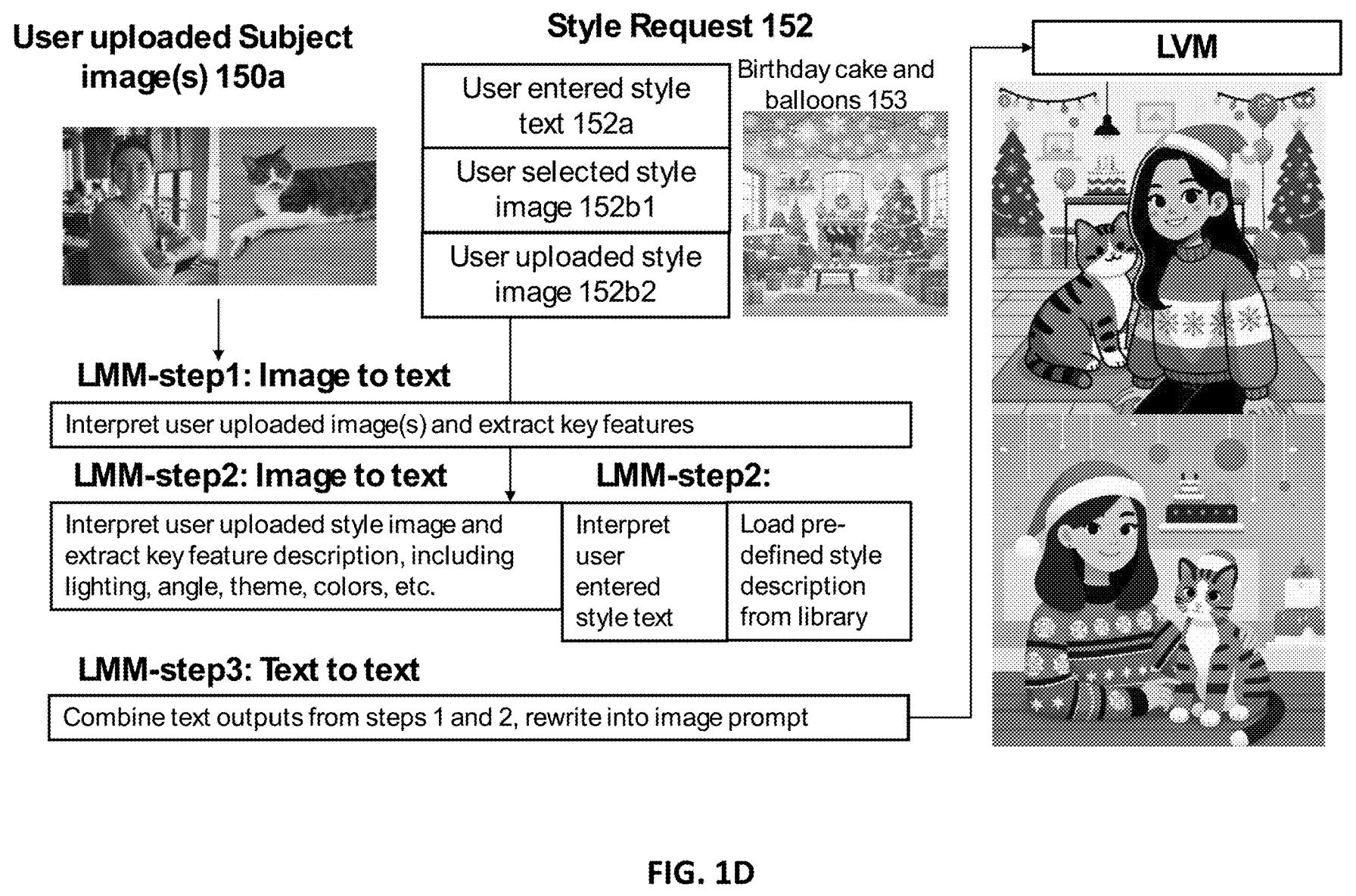

User uploaded Subject image(s) 150a

Style Request 152

Birthday cake and balloons 153

User entered style text 152a

User selected style image 152b1

User uploaded style image 152b2

LVM

LMM-step1: Image to text

Interpret user uploaded image(s) and extract key features

LMM-step2: Image to text

Interpret user uploaded style image and extract key feature description, including lighting, angle, theme, colors, etc.

LMM-step2:

Interpret user entered style text

Load pre-defined style description from library

LMM-step3: Text to text

Combine text outputs from steps 1 and 2, rewrite into image prompt

FIG. 1D

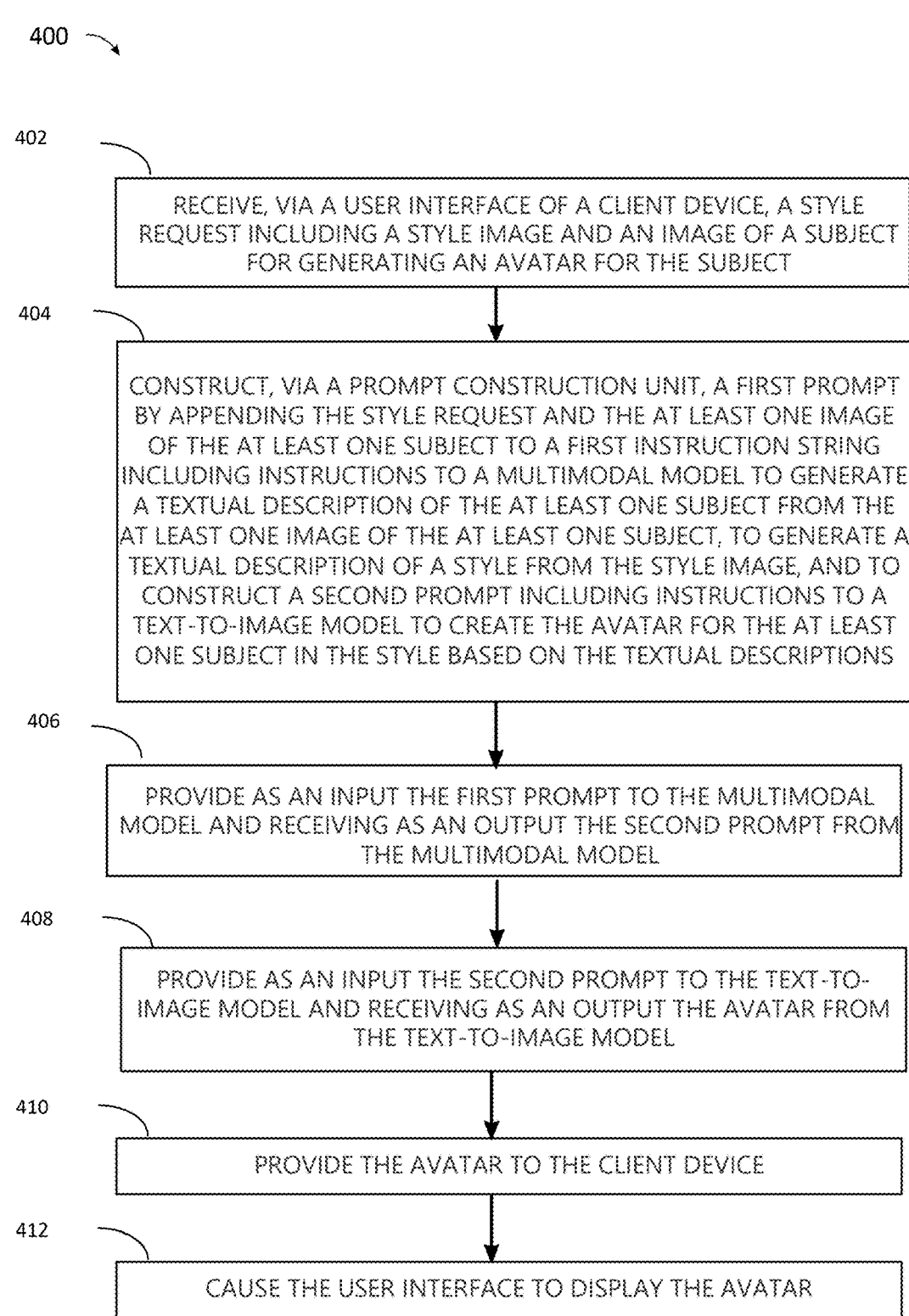

400

402

RECEIVE, VIA A USER INTERFACE OF A CLIENT DEVICE, A STYLE REQUEST INCLUDING A STYLE IMAGE AND AN IMAGE OF A SUBJECT FOR GENERATING AN AVATAR FOR THE SUBJECT

404

CONSTRUCT, VIA A PROMPT CONSTRUCTION UNIT, A FIRST PROMPT BY APPENDING THE STYLE REQUEST AND THE AT LEAST ONE IMAGE OF THE AT LEAST ONE SUBJECT TO A FIRST INSTRUCTION STRING INCLUDING INSTRUCTIONS TO A MULTIMODAL MODEL TO GENERATE A TEXTUAL DESCRIPTION OF THE AT LEAST ONE SUBJECT FROM THE AT LEAST ONE IMAGE OF THE AT LEAST ONE SUBJECT, TO GENERATE A TEXTUAL DESCRIPTION OF A STYLE FROM THE STYLE IMAGE, AND TO CONSTRUCT A SECOND PROMPT INCLUDING INSTRUCTIONS TO A TEXT-TO-IMAGE MODEL TO CREATE THE AVATAR FOR THE AT LEAST ONE SUBJECT IN THE STYLE BASED ON THE TEXTUAL DESCRIPTIONS

406

PROVIDE AS AN INPUT THE FIRST PROMPT TO THE MULTIMODAL MODEL AND RECEIVING AS AN OUTPUT THE SECOND PROMPT FROM THE MULTIMODAL MODEL

408

PROVIDE AS AN INPUT THE SECOND PROMPT TO THE TEXT-TO-IMAGE MODEL AND RECEIVING AS AN OUTPUT THE AVATAR FROM THE TEXT-TO-IMAGE MODEL

410

PROVIDE THE AVATAR TO THE CLIENT DEVICE

412

CAUSE THE USER INTERFACE TO DISPLAY THE AVATAR

AI-BASED AVATAR CREATION USING STYLE TRANSFER AND SUBJECT IMAGES

BACKGROUND

Artificial intelligence (AI) has the potential to automate our lives to save time and increase productivity. One area of interest is avatar creation, and image generative models have become popular and powerful tools for creating avatars. However, a lot of existing AI-based avatar creation platforms or applications require users to either manually enter text prompts or craft existing text prompt templates to generate avatars. It is frustrating and/or time-consuming for the users to repeatedly tweak the text prompts to generate avatars before getting satisfactory results. Other AI-based avatar creation applications accept user-upload personal photos yet with usage limitations. For example, some AI image generation programs ask a user to upload 10-20 personal photos to train an AI model for 20-30 minutes, then take in a text prompt (e.g., "An avatar of me as a jedi"), or a text prompt template to generate an avatar. This approach consumes a lot of time and resources. As another example, one AI-based avatar creator asks a user to select an avatar style template and upload one personal photo, then the avatar creator automatically generates a set of various avatars based on the style template for the user to select. This approach is more efficient yet with limited style template selections. There are technical challenges to provide users with fast and easy AI-based avatar creation while transferring any user-desired image styles onto avatars. Hence, there is a need for fast and easy AI-based avatar creation systems and methods that transfer any user-desired image styles onto avatars resembling the user.

SUMMARY

An example data processing system according to the disclosure includes a processor and a machine-readable medium storing executable instructions. The instructions when executed cause the processor alone or in combination with other processors to perform operations including receiving, via a user interface of a client device, a style request and at least one image of at least one subject for generating an avatar for the at least one subject, the style request including a style image; constructing, via a prompt construction unit, a first prompt by appending the style request and the at least one image of the at least one subject to a first instruction string, the first instruction string including instructions to a multimodal model to generate a textual description of the at least one subject from the at least one image of the at least one subject, to generate a textual description of a style from the style image, and to construct a second prompt including instructions to a text-to-image model to create the avatar for the at least one subject in the style based on the textual descriptions; providing as an input the first prompt to the multimodal model and receiving as an output the second prompt from the multimodal model; providing as an input the second prompt to the text-to-image model and receiving as an output the avatar from the text-to-image model; providing the avatar to the client device; and causing the user interface of the client device to display the avatar.

An example method implemented in a data processing system includes receiving, via a user interface of a client device, a style request and at least one image of at least one subject for generating an avatar for the at least one subject, the style request including a style image; constructing, via a prompt construction unit, a first prompt by appending the style request and the at least one image of the at least one subject to a first instruction string, the first instruction string including instructions to a multimodal model to generate a textual description of the at least one subject from the at least one image of the at least one subject, to generate a textual description of a style from the style image, and to construct a second prompt including instructions to a text-to-image model to create the avatar for the at least one subject in the style based on the textual descriptions; providing as an input the first prompt to the multimodal model and receiving as an output the second prompt from the multimodal model; providing as an input the second prompt to the text-to-image model and receiving as an output the avatar from the text-to-image model; providing the avatar to the client device; and causing the user interface of the client device to display the avatar.

An example non-transitory computer readable medium data processing system according to the disclosure on which are stored instructions that, when executed, cause a programmable device to perform functions of receiving, via a user interface of a client device, a style request and at least one image of at least one subject for generating an avatar for the at least one subject, the style request including a style image; constructing, via a prompt construction unit, a first prompt by appending the style request and the at least one image of the at least one subject to a first instruction string, the first instruction string including instructions to a multimodal model to generate a textual description of the at least one subject from the at least one image of the at least one subject, to generate a textual description of a style from the style image, and to construct a second prompt including instructions to a text-to-image model to create the avatar for the at least one subject in the style based on the textual descriptions; providing as an input the first prompt to the multimodal model and receiving as an output the second prompt from the multimodal model; providing as an input the second prompt to the text-to-image model and receiving as an output the avatar from the text-to-image model; providing the avatar to the client device; and causing the user interface of the client device to display the avatar.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 1B-1D are conceptual diagrams of a visual style transfer to avatar pipeline of the system of FIG. 1A according to principles described herein.

FIG. 4 is a flow chart of an example process for AI-based visual style transfer via automatically describing a style image in a text prompt according to the techniques disclosed herein.

DETAILED DESCRIPTION

Figure 1A:
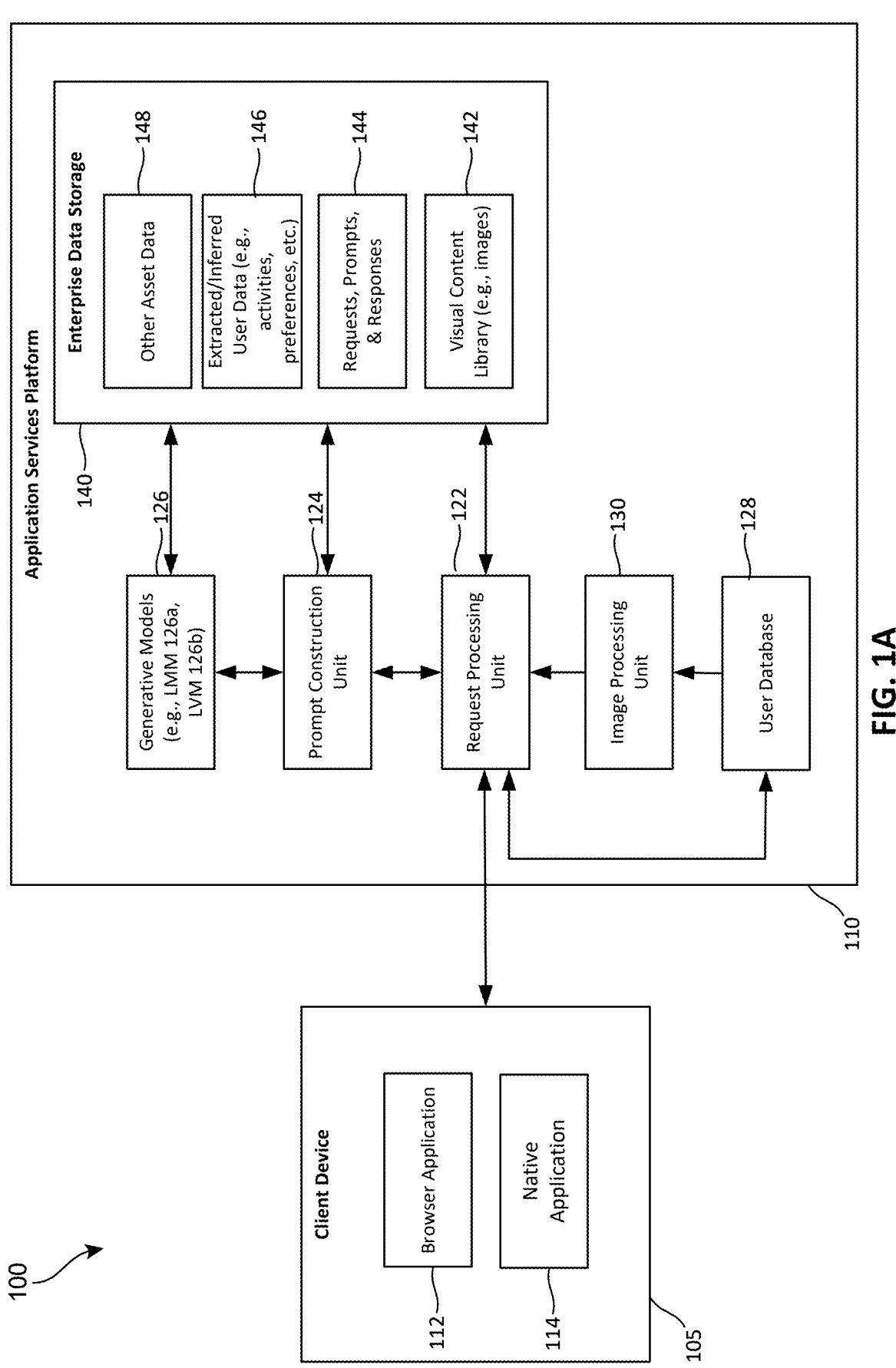
FIG. 1A is a diagram of an example computing environment in which the techniques for AI-based visual style transfer via automatically describing a style image in a text prompt are implemented.

Systems and methods for AI-based visual style transfer onto an avatar of a subject via automatically describing subject image(s) and a style image are described herein. These techniques provide a technical solution to the technical problem of lack of fast and easy AI-based avatar creation systems and methods that transfer any user-desired image styles onto avatars. The existing AI-based avatar creation systems automate many design tasks that were previously done manually, such as avatar creation prompt generation, avatar template generation, and the like. Prompt engineering has been a critical aspect of Large Language Models (LLMs) and Large Vision Models (LVMs) since their inception. Effective prompting skills are essential for achieving high-quality avatars when utilizing LVMs.

Although these systems help users to work more efficiently and produce better avatars, they often require the users to repeatedly tweak the text prompts to generate satisfactory avatars, even when starting with a pre-existing text prompt. While this text-to-image approach can provide impressive results, its efficacy and ability is contingent upon the user's proficiency in crafting effective text prompts. On the other hand, some avatar creation programs are easy to use, but with limited user control over different aspects of the avatar's appearance, and being limited to a number of available styles, as well as time and cost for inputting 20-30 personal images to train the model. There are other avatar creation programs that are fast and easy to use, and can create multiple avatars at once with different variations, yet they are limited to available style templates.

To address these issues, the proposed technical solution improves avatar creation using generative model(s) by applying a multimodal model (e.g., a LMM) that automatically describes a style image and subject image(s) in text and then rewrites the textual descriptions into a text prompt as an input to a text-to-image model (e.g., a LVM) to generate avatar(s) of the subject in the desire style. The system developed by the inventors provides a novel visual style transfer to avatar pipeline designed to streamline avatar creation. This pipeline eliminates the need for manually converting a style image and subject image(s) into text descriptions, and enables users to directly upload subject image(s) and a style image to create an avatar for the subject in the desire style in the style image. The pipeline autonomously executes the processes of style transfer and avatar creation behind the scenes. This pipeline not only simplifies the workflow but also enhances the accessibility and efficiency of style replication in avatar creation.

By applying generative model(s) on a style image and subject image(s) selected by the user, the system/pipeline can capture visual elements (e.g., gender, skin tone, age, race, or the like) sufficiently identifying the subject and visual elements reflecting the style. As such, the user can easily generate avatar(s) of the subject(s) with the desired style. The system thus reflects the style of the style image (e.g., the layout and structure, color, style, typography, whitespace, texture, scale, or the like) in the avatar(s) of the subject(s).

In one example, the system provides an improved method for avatar creation that provides a user experience for creating a generated avatar in which the user can upload at least one image such as of themselves, along with a style goal (e.g., a style image). The system applies a large language model (LLM, e.g., GPT-4V) to interpret the subject image to extract key features to be retained in the generated avatar (i.e., user avatar features). The LMM also interprets the style goal/image as a textual style prompt. The LMM rewrites the key subject features and the style text description into an image generation prompt that is sent to a large visual model (LVM, e.g., DALLE-3) to create the avatar for the subject in the style. The example addresses the technical problem of text-only prompting for avatar generation that does not permit users to upload images for more personalized avatars. The example further supports stylized avatar generation by describing the desired style in sufficient detail thereby enhancing user experience of avatars refined with desired style details. Therefore, the system provides an easy-to-use user experience (UX) related to an avatar creation in which a tangible result in the form of personalized avatars infused with a desired style details, that can be used in any systems, platforms, or applications (e.g., Google Workspace®, Notion®, Miro®, and the like) to represent the user.

A technical benefit of the approach provided herein is to perform visual content style transfer to avatar through LMMs and LVMs within a design platform with great user convenience by allowing users to upload a subject image and a style image, thereby alleviating the burden of style text prompt engineering during the avatar creation process.

Another technical benefit of this approach is to provide a visual style transfer to avatar pipeline that takes any user-desired style image and a subject image at runtime to produce an avatar with the subject in the transferred style with an optional background to present to the user. The automated visual content style transfer to avatar can accept any style image provided by the user rather than limited to set style images, thereby improving the user experience. Moreover, the avatar(s) in the selected style and with optional background is presented to the user with high quality.

Another technical benefit of the approach provided herein is to capitalize on a suite of powerful tools to understand user subject requests and style requests, both of which can be in image and/or text format. By converting a style image into a text style prompt, the system generates the avatar for the subject in the subject request in the user-desired style, and optionally creates a background with object(s) based on an object request. Therefore, the generated avatar(s) more accurately represents the user preferences. Not only does this improve the productivity of the user, but this approach can also decrease the computing resources required to refine the style based on refined user queries to the generative models.

Another technical benefit of the approach provided herein is to combine multiple subjects from different images into a single image of multiple avatars.

Another technical benefit of the approach provided herein is to significantly improve the user experience in avatar creation within a design platform and in deployment as a new mini-application within the design platform, or within any other platforms/applications when the user signs up the other platforms/applications for the first time or at any point when the user desires to create a personalized avatar.

Another technical benefit of the approach provided herein is to provide a user with control to adjust an avatar based on criteria (such as a subject feature preservation score, a style preservation score, a creativity score, or the like) via user entries and/or user feedbacks. For example, the user may want an avatar to use at the user's workplace resembling the user very closely, while the avatar at a gaming platform remotely resembling the user yet with a personal/creative touch, to maintain a balance between a sense of identity and preserving the user's privacy and personal boundaries in different contexts.

Another technical benefit of this approach is storing the avatar(s) as style image(s) in the system thereby saving the user significant time and effort in creating similar avatars in the future. Yet another technical benefit of this approach is that other users can utilize the new style image(s) to save time and effort. These and other technical benefits of the techniques disclosed herein will be evident from the discussion of the example implementations that follow.

FIG. 1A is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to AI-based avatar creation applications, presentation applications, website authoring applications, collaboration platforms, communications platforms, and/or other types of applications in which users may create, view, and/or modify various types of graphic designs. In the implementation shown in FIG. 1A, the application services platform 110 also applies generative AI to easily generate fast and satisfactory avatars upon user demand according to the techniques described herein. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1A includes a single client device 105, other implementations may include a different number of client devices that utilize services provided by the application services platform 110.

Style transfer is a technique in computer vision and graphics that involves generating a new style image (e.g., an image) by combining the content of one image with the style of another image. In the context of style transfer, style refers to the distinctive visual characteristics of a style image (e.g., an image). These characteristics can include color palette, texture (e.g., brushstrokes), composition, layout, level of details and abstraction, overall mood, atmosphere, and the like. Although various embodiments are described with respect to a style image, it is contemplated that the approach described herein may be used with other visual content items.

The term "visual content item" refers to any human visible content item. Common forms of visual content item include photos, diagrams, charts, images, infographics, videos, animations, screenshots, memes, slide decks, pictograms, ideograms, gaming interfaces, software application backgrounds, graphic designs (e.g., publication, email marketing templates, PowerPoint presentations, menus, social media ads, banners and graphics, marketing and advertising, packaging, visual identity, art and illustration graphic design, and the like), etc.

The term "avatar" refers to a visual representation of a person or character for use in digital contexts. It's usually a computer-generated image, such as a bitmoji. On social media, the term "avatar" also refers to a profile image represents a user on the platform.

A visual content "theme" is a unifying concept or idea that guides the visual elements of a design project. It helps to convey a specific message or atmosphere and create a cohesive and consistent look and feel for the project. Common elements of a visual content theme include color palette, typography, imagery (e.g., photographs, illustrations, or icons), layout, style (e.g., minimalist, retro, or modern), and the like.

"Textual prompt" and "text prompt" are used interchangeably in the disclosure. "Textual prompt" is more formal, while "text prompt" is more casual.

Although various embodiments are described with respect to image style transfer based on one style image and one subject image, it is contemplated that the approach described herein may be used to generate one avatar based on a plurality of style images and/or a plurality of subject images of one or more subjects.

Although various embodiments are described with respect to image style transfer, it is contemplated that the approach described herein may be used with any visual content style transfer, such as graphic designs (e.g., publication, email marketing templates, PowerPoint presentations, menus, social media ads, banners and graphics, marketing and advertising, packaging, visual identity, art and illustration graphic design, and the like), photography, videography, animation, motion graphics, user interface graphic design (e.g., game interface, app design, etc.), event and conference spaces, and the like.

The client device 105 includes a native application 114 and a browser application 112. The native application 114 is a web-enabled native application, in some implementations, which enables easy visual content style transfer. The web-enabled native application utilizes services provided by the application services platform 110 including but not limited to creating, viewing, and/or modifying various styles of avatars style transfer. The native application 114 implements a user interface 205 shown in FIGS. 2A-2E in some implementations. In other implementations, the browser application 112 is used for accessing and viewing web-based content provided by the application services platform 110. In such implementations, the application services platform 110 utilizes one or more web applications, such as the browser application 112, that enables users to view, create, and/or modify visual content style transfer using for example an online application. The browser application 112 implements the user interface 205 shown in FIGS. 2A-2E in some implementations. The application services platform 110 supports both the native application 114 and the browser application 112 in some implementations, and the users may choose which approach best suits their needs.

The application services platform 110 includes a request processing unit 122, a prompt construction unit 124, generative model(s) 126, a user database 128, an image processing unit 130, an enterprise data storage 140, and moderation services (not shown).

The request processing unit 122 is configured to receive requests from the native application 114 and/or the browser application 112 of the client device 105. The requests may include but are not limited to requests to create, view, and/or modify various styles of avatars according to the techniques provided herein.

FIGS. 1B-1D are conceptual diagrams of a visual style transfer to avatar pipeline of the system of FIG. 1A according to principles described herein. The pipeline leverages the advanced capabilities of LMMs and LVMs in the visual style transfer to avatar pipeline. This pipeline is designed to generate avatars based on subject image(s) and style image (s) user-requested at runtime, e.g., interpreting the images at runtime into textual descriptions then combining them into a textual prompt for a LVM to generate avatar(s). In one embodiment, the generative models 126 includes a first generative model (e.g., a LMM 126a) that automatically describes a subject image and a style image desired by a user in textual descriptions and rewrites the descriptions into a textual prompt, and a second generative model (e.g., a LVM 126b) that inputs the textual prompt to generate avatar(s). This textual prompt applies the user's requested style on the subject.

The LMM 126a can interpret and convert identifying feature elements of a subject in subject image(s) by generating a subject textual description based on an example subject meta prompt (e.g., a subject-meta-prompt in Table 1). The meta prompt can be adapted or extended based on different implementations, such as different generative models.

TABLE 1

You work as a bot to understand the image and describe the image. Make sure to capture key features of the subjects in the image. Note that subject images may contain different subjects, you need to consider all of them and describe with detail all of them.

The LMM 126a can interpret and convert style elements of a style image by generating a style textual description based on an example style meta prompt (e.g., a style-meta-prompt in Table 2). The meta prompt can be adapted or extended based on different implementations, such as different generative models.

TABLE 2

As a bot, your role is to understand the provided style image and craft a DALL•E prompt that captures the style and colors of the style image. Make sure to capture the details and style of the image, proportions and perspective, color palette, lighting and shadows, texture and material, mood and atmosphere, context and background of the image.

Either prompt construction unit 124, or the LMM 126a can rewrite the subject textual description and the style textual description into an image generation meta prompt for the second generative model (e.g., a LVM 126b, a text-to-image model, or the like) to generate avatar(s) of the subject that embodies the style. One example image generation meta prompt is listed in Table 3. The meta prompt can be adapted or extended based on different implementations, such as different image generative models.

TABLE 3

Your task is to copy the style of an image description and recreate a compelling DALL•E prompt to create an avatar. As a bot, your role is to understand the provided description and craft a DALL•E prompt that captures the style and colors of the avatar and incorporate user's input. This DALL•E prompt will be used to generate an avatar image resembling the style and colors of the given avatar image description.

Please adhere to the following rules:

Ensure that the DALL•E-generated avatar image closely resembles the style and colors of the avatar image described.

Craft the DALL•E prompt in a manner that replicates the style and color scheme of the provided avatar image description.

Ensure that the avatar prompt is good for an avatar creation and the background should be blank and clean to emphasize the foreground avatar figure.

Keep the DALL•E prompt concise, containing between 15 to 80 words. Any extra words will be disregarded.

Format your response to provide only the avatar image caption.

Now, here is the sample image description: {result of style-meta-prompt}.

Could you generate DALL•E image prompt for a {result of subject-meta-prompt} with the same style and colors as shown in the sample image description?

In another embodiment, to reduce latency and the number of calls to the LMM 126a, the system uses a meta-prompt that rewrites all the above-referenced meta prompts of Tables 1-3 in Table 4. In this case, the LMM 126a (e.g., e.g., GPT-4V) can take multiple images and text content items as an input, e.g., GPT-4V based on the meta-prompt in Table 4. The meta prompt can be adapted or extended based on different implementations, such as different generative models.

and describes it in a style textual description (e.g., the style text 152c). The meta prompt in Table 2 provides context and guidance to the LMM 126a, and helps the LMM 126a to capture the style depicted in the style image 152b. As such, the LMM 126a produces an accurate style textual description capable of reproducing the style image 152b, forming the basis for style transfer onto the subject (e.g., a user).

The system provides users with the ability to generate personalized avatars with an unlimited range of styles. This

TABLE 4

You will be given multiple images, first is style image, rest are subject images. Your task is to copy the style of a style image and recreate a compelling DALL•E prompt. As a bot, your role is to understand the provided style image and craft a DALL•E prompt that captures the style and colors of the style image and apply it to the subjects ex. You need to understand the subject image and extract the major subject of the image for styles to apply. In addition, make sure to capture the details and style of the image, proportions and perspective, color palette, lighting and shadows, texture and material, mood and atmosphere, context and background of the image. Could you generate DALL•E image prompt for a subject in the subject image with the same style and colors as shown in the style image? The first image you receive is a style image, the rest are subject images. Note that subject images may contain different subjects, you need to consider all of them and make sure all subjects appear in the final image prompt.

In another embodiment, at least one of the meta prompts in Tables 1~4 includes a negative prompt to steer the generative model 126 away from generating undesirable content. A negative prompt is the opposite of a positive prompt, which is used to guide the model towards generating the specific type of content. For instance, the meta prompt can include a negative prompt to avoid generating a "blurry," "pixelated," "low quality," "violent," or "hateful" image.

Finally, the system incorporates a result check through the LMM 126a to ensure that the final generated avatar contains the key features from the subject photo and achieves the designated style goal. Avatars that pass the quality check are then delivered to users. Due to latency concerns, an alternative method for the quality check involves reviewing the generated image prompt in Table 3 while the LVM 126b is generating the avatar.

In the following examples, the user requests to create stylized avatars of themselves, families, friends, pets, and the like. In FIG. 1B, the request processing unit 122 receives a user subject request 150 (including a subject image 150a), and forwards it to the prompt construction unit 124. The prompt construction unit 124 sends the user subject request 150 and the subject-meta-prompt in Table 1 to the LMM 126a (e.g., GPT-4V) to extract key identifying features of the subject depicted in the subject image 150a (e.g., a user sitting in a restaurant image). The key identifying features of the subject are to be retained in the generated avatar. The LMM 126a then converts the key identifying features of the subject into a subject textural description 150b.

Concurrently, the request processing unit 122 receives a user style request 152 (including at least one of a style text 152a, or a style image 152b), and forwards it to the prompt construction unit 124. The prompt construction unit 124 sends the user style request 152 and the style-meta-prompt in Table 2 to the LMM 126a. When the user stylet request 152 includes the style text 152a (e.g., a flat design style), the LMM 126a directly rewrites the style text 152a and the subject textural description 150b into a text prompt for further processing.

When the user stylet request 152 includes the style image 152b, the LMM 126a converts the style image 152b into a style text 152c based on, for example, the meta prompt in Table 2, and then rewrites the style text 152c and the subject textural description 150b into a text prompt for further processing. To understand the style depicted in the style image 152b, the LMM 126a interprets the style image 152b, is made possible through: natural language style descriptions and/or style image upload. With the natural language style descriptions, users can simply describe the desired style in their own words, and the system will generate a personalized avatar for the user with a style that matches the description. Alternatively, the user can also upload an image as a style goal. This feature enables the user to take inspiration from any images and use them as a basis for generating new and unique avatars.

The LVM 126b (e.g., DALLE-3) can process the textual prompt to generate an avatar 154, e.g., a user avatar with a flat design style 154a.

In another embodiment depicted in FIG. 1B, the user optionally provides an object request 153 for generating a background of the avatar. The background includes at least one object (e.g., a birthday cake and balloons). The object request 153 can include at least one of an object text 153a, or an object image 153b.

When the object request 153 includes the object text 153a, the LMM 126a directly rewrites the object text 153a and the textural descriptions into a text prompt for further processing. When the object request 153 includes the object image 153b, the LMM 126a converts the object image 153b into an object text 153c, and then rewrites the object text 153c and the textural descriptions into a text prompt for further processing. The LVM 126b (e.g., DALLE-3) can process the textual prompt to generate an avatar with a background 154b, e.g., a user avatar with a flat design style and a background of a birthday cake and balloons.

In FIG. 1C, the user adds a subject image 150c (i.e., a cat), and switches to a different style request (i.e., a Christmas-themed flat design style). In this case, the request processing unit 122 additionally receives the subject image 150c, and forwards it to the prompt construction unit 124. The prompt construction unit 124 sends the user subject request 150 (including the subject images 150a, 150c) and the subject-meta-prompt in Table 1 to the LMM 126a (e.g., GPT-4V) to extract key identifying features of the subjects depicted in the subject images 150a, 150c (e.g., a user sitting in a restaurant image, a cat lying on the floor). The key identifying features of the subjects are to be retained in the generated avatar. The LMM 126a then converts the key identifying features of the subjects into a subject textural description 150d.

Concurrently, the request processing unit 122 and the LMM 126a process the style text 152d (e.g., a Christmas-themed flat design style) as they did with the style text 152a, and the LVM 126b can process the textual prompt to generate an avatar with Christmas theme flat design style 154c. In another embodiment depicted in FIG. 1C, the user optionally provides the object request 153 for generating a background of the avatar. The request processing unit 122 and the LMM 126a process the object request 153 as described, and then the LVM 126b can process the textual prompt to add a background to the avatar and display it as an avatar with Christmas theme flat design style & objects 154d.

FIG. 1D is an overall system diagram, according to one embodiment. The system provides users with an easy starting point, allowing them to easily create an avatar using subject image(s) 150, a style request 152, and optionally an object request 153. The style request 152 can be at least one of a user-entered style text 152a, a user-selected style image 152b1 (e.g., from a style image library), or a user-uploaded style image 152b2.

The system then uses the LMM 126a to convert any non-textual input(s) into textural description(s), and then rewrites all textural descriptions into an image generation prompt for the LVM 126b to create personalized avatar(s). FIG. 1D shows the avatar with Christmas theme flat design style & objects 154d, and a variation. For instance, the LMM 126a interprets the subject image(s) 150 and extracts key identifying features of the subjects in step 1. In step 2, the LMM 126a interprets the user-uploaded style image 152b2 and extracts key style feature description, including lighting, angle, theme, colors, etc. Alternatively or concurrently, the LMM 126a (1) directly incorporate or interpret the user-entered style text 152a, and/or (2) loads a pre-defined textual style description based on the user-selected style image 152b1 from the library. In step 3, the LMM 126a combines all of the textual descriptions from steps 1 and 2, and rewrites the combined textual descriptions into an image generation prompt.

In another embodiment, the system further provides prompt refinement. Once we have the textual prompt, the system undertakes an optional prompt refinement step through another generative model call, such as calling the LMM 126a based on a feedback loop (e.g., a reflection loop). In some implementations, each generative model call needs to pass a responsible AI test. In one embodiment, a responsible AI test is a comprehensive evaluation process that ensures a generative model adheres to ethical principles and operates safely and fairly in the real world. In another embodiment, the test not only checks if the generative model performs its intended task accurately, but also assess its potential for harm and mitigating negative impacts.

For instance, at least one of the meta prompts in Tables 1-4 can be a self-improving agent that can modify its own instructions based on its reflections on user interactions. In one embodiment, the at least one meta prompt can include instructions that guides the agent on how to improve its own instructions based on user positive, neutral, or negative feedback on the avatar 154, such as a user selection of a thumbs-up tab, a thumbs-down tab, a neutral tab, or a generating-more-image tab, a textual input, or the like. The system can then create another avatar based on the refined textual prompt, and serve the refined avatar to the user.

In yet another embodiment, the system further improves the quality of the avatar 154 via a quality check to ensure that the textual prompt contains the requested subject and style. The system can then create the avatar based on the checked textual prompt, and serve the avatar to the user.

In some implementations, instead of image style transfer based on one style image and one subject image as the above-discussed example, the system can generate one avatar based on a plurality of style images (e.g., a museum exhibit room image, a morning lake image, a living room with a fireplace image, and the like) and/or a plurality of subject images (e.g., a person and a cat).

In other implementations, instead of image style transfer on avatars based on one style image and one subject image as the above-discussed example, the system can transfer other style visual content items, e.g., diagrams, charts, infographics, videos, animations, screenshots, memes, slide decks, pictograms, ideograms, gaming interfaces, software application backgrounds, graphic designs, or the like. For example, the system can generate an avatar based on a style videography, animation, motion graphics, or the like.

In some implementations, the system makes the avatar 154 produced by the pipeline editable, such as adding textual content in the avatar 154, thus offering more user control over their AI-generated content (AIGC) experiences. For instance, after generating the avatar 154, either the LMM 126a or the prompt construction unit 124 can query the user for more usage context details, such as the nature of the platform/application to use the avatar, and then add more details to the avatar 154. For example, if the user applies the avatar in a sports fan chat room, the system can add more visual elements associated with the supported sports teams to the user avatar. In another embodiment, the system can extract/infer the avatar usage context details from the user database 128. For example, the prompt construction unit 124 can retrieve user preference data 128a (shown in FIG. 3) from the user database 128 based on an indication identifying the user. The indication may be a user identifier (e.g., a username, email address, and the like), and/or other identifier associated with the user that the application services platform 110 can use to identify the user and retrieve user data. The user data can include a username, a user organization, a user preferred graphic design style (e.g., minimalism, retro, art deco, Memphis design, Swiss style, Bauhaus, pop art, punk, etc.), and the like. As such, when the user does not provide the avatar usage context details, the prompt construction unit 124 may retrieve the missing information from the user preference data 128a, instead of asking more questions for the missing information via an AI chat interface.

In another embodiment, the prompt construction unit 124 can use user data from various user data source(s) to generate the avatar usage context details. For instance, user preference data 128a (depicted in FIG. 3) can be digitized and stored in the user database 128. The user data source(s) can be online/offline databases (e.g., emails, social media posts, and the like), documents, articles, books, presentation content, and/or other types of content containing user activity information.

FIGS. 2A-2E are diagrams of an example user interface of an AI-based visual style transfer to avatar application that implements the techniques described herein. The example user interface shown in FIGS. 2A-2E is a user interface of an AI-based visual style transfer to avatar application within an AI-based design platform, such as but not limited to Microsoft Designer®. However, the techniques herein for AI-based visual style transfer via automatically describing a subject image and a style image in a textual prompt are not limited to use in an AI-based design platform and may be used to generate avatars for other types of applications including but not limited to presentation applications, website authoring applications, collaboration platforms, communications platforms, and/or other types of applications in which users create, view, and/or modify various styles of avatars. Such applications can be a mini application in an AI-based design application, a stand-alone application, or a plug-in of any application on the client device 105, such as the browser application 112, the native application 114, and the like. For example, the system can work on the web or within a virtual meeting and collaboration application (e.g., Microsoft Teams®) or an email application (e.g., Out-look®). The system can be integrated into the Microsoft Viva® platform or could work within a browser (e.g., Windows® Edge®). The system can also work within a social media website/application (e.g., Facebook®, Instagram®).

Figure 2A:
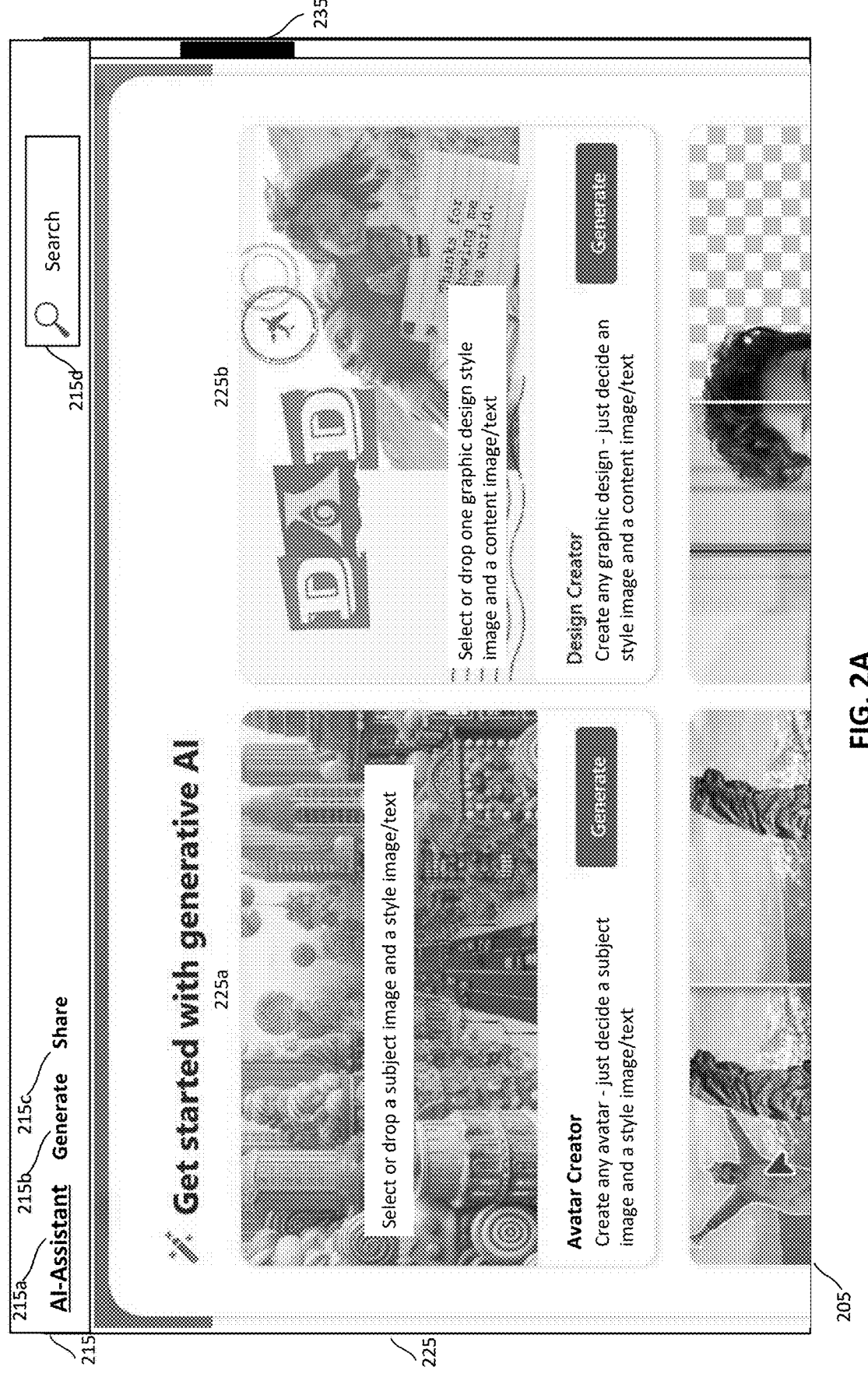
FIGS. 2A-2E are diagrams of example user interfaces of an AI-based visual style transfer to avatar application that implements the techniques described herein.

FIG. 2A shows an example of the user interface 205 of an AI-based visual style transfer to avatar application in which the user is interacting with AI generative model(s) to generate an avatar with desired style(s) and an optional background with object(s). The user interface 205 includes a control pane 215, a chat pane 225 and a scrollbar 235. The user interface 205 may be implemented by the native application 114 and/or the browser application 112.

In some implementations, the control pane 215 includes an Assistant button 215a, a Generate button 215b, a Share button 215c, and a search field 215d. The AI-Assistant button 215a can be selected to provide visual style transfer assistant functions as later discussed. In some implementations, the chat pane 225 provides a workspace in which the user can enter prompts in the AI-based visual style transfer to avatar application for generating avatar(s) with desired style(s) and an optional background with object(s). In the example shown in FIG. 2A, the chat pane 225 shows at least two mini application tiles 225a and 225b.

The mini application tile 225a represents an avatar creator and depicts a description of "Create any avatar-just decide a subject image and a style image/text." The mini application tile 225a also depicts a prompt enter box over a background image and a "Generate' button. The prompt enter box shows an instruction of "Select or drop a subject image and a style image/text."

The mini application tile 225b represents a design creator and depicts a description of "Create any graphic design-just decide a style image and a content image/text." The mini application tile 225b also depicts a prompt enter box over a background image and a "Generate' button. The prompt enter box shows an instruction of "Create any graphic design-just decide a style image and a content image/text."

In one embodiment, the mini application tile 225a invites a user to enter a subject image and a style image/text that the user would like to have avatar(s) automatically generated by the generative model(s) 126 of the application services platform 110. The application submits a textual prompt as discussed above and user information identifying the user of the application to the application services platform 110. The application services platform 110 processes the text prompt according to the techniques provided herein to generate an avatar with desired style(s) and an optional background with object(s).

The Generate button 215b can be selected to generate an avatar with desired style(s) and an optional background with object(s) corresponding to a user style request (e.g., the style request 152) and a user object request (e.g., a birthday cake and balloons). The Share button 215c can be selected to trigger a dropdown list of applications to share an avatar (e.g., the avatar 154). For example, the user can post the avatar on a social media application (e.g., Facebook®) to celebrate the user's birthday. The search field 215d is for a user to enter a search word, phrase, paragraph, and the like within the visual content library 142, the requests, prompts, and responses 144, the extracted/inferred user data 146 (e.g., activities, preferences, or the like), the other asset data 148, and the like. The fields in the visual style transfer to avatar application can provide auto-fill and/or spell-check functions.

Figure 2B:
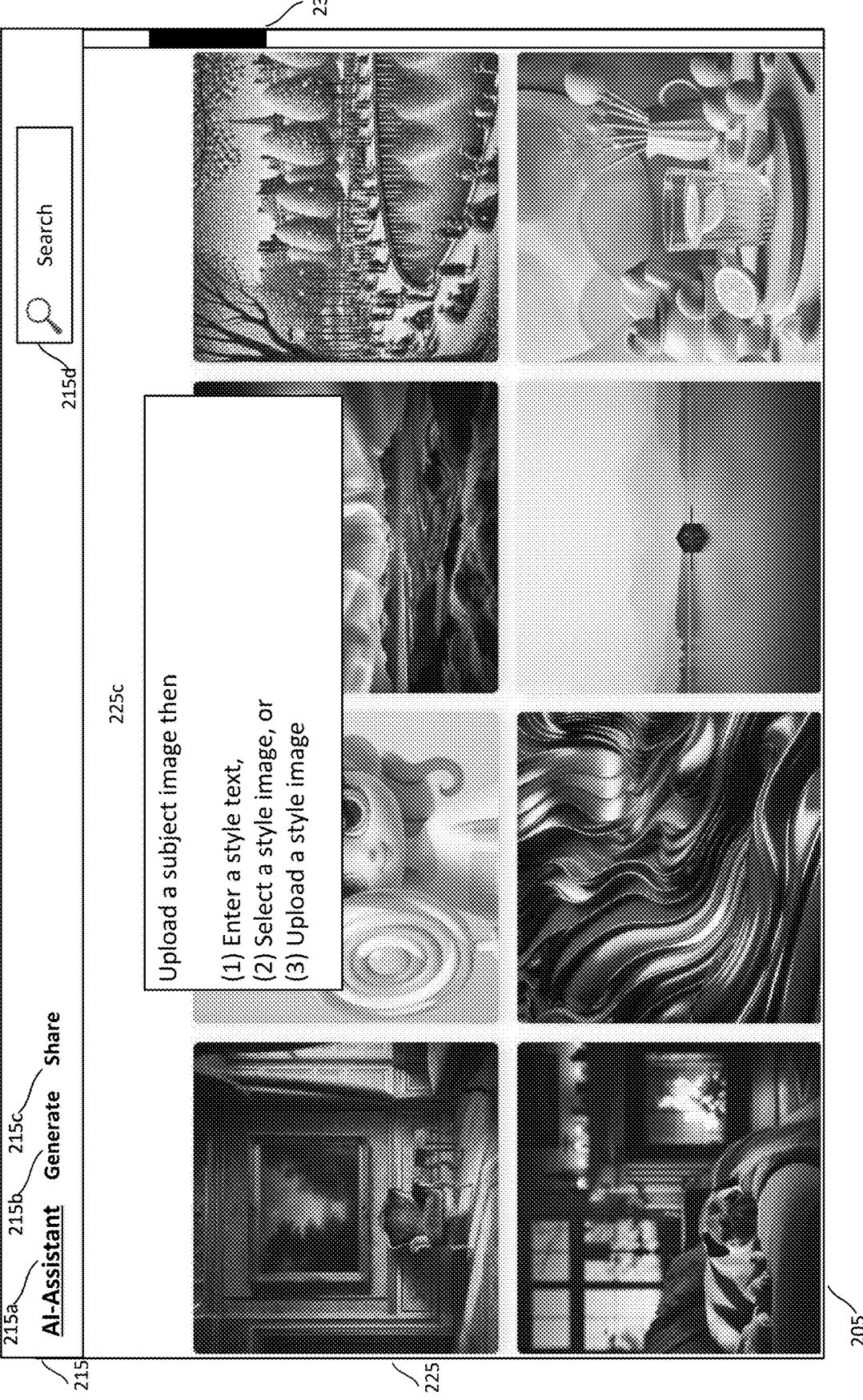

FIG. 2B continues from FIG. 2A upon a selection of the mini application tile 225a. In this example, the chat pane 225 shows a prompt enter box 225c with an instruction of "Upload a subject image then (1) Enter a style text, (2) Select a style image, or (3) Upload a style image" and several style images for the user to select. After the user drops a subject image of a baby elephant into the prompt enter box 225c, the chat pane 225 shows a prompt enter box 225d with an instruction of "Select one of the following images as a style image for generating avatar" and several style templates for the user to select in FIG. 2C. The chat pane 225 further shows a field 225e with an instruction of "Explore other styles" and a field 225f with an instruction of "Explore other subjects."

Figure 2C:
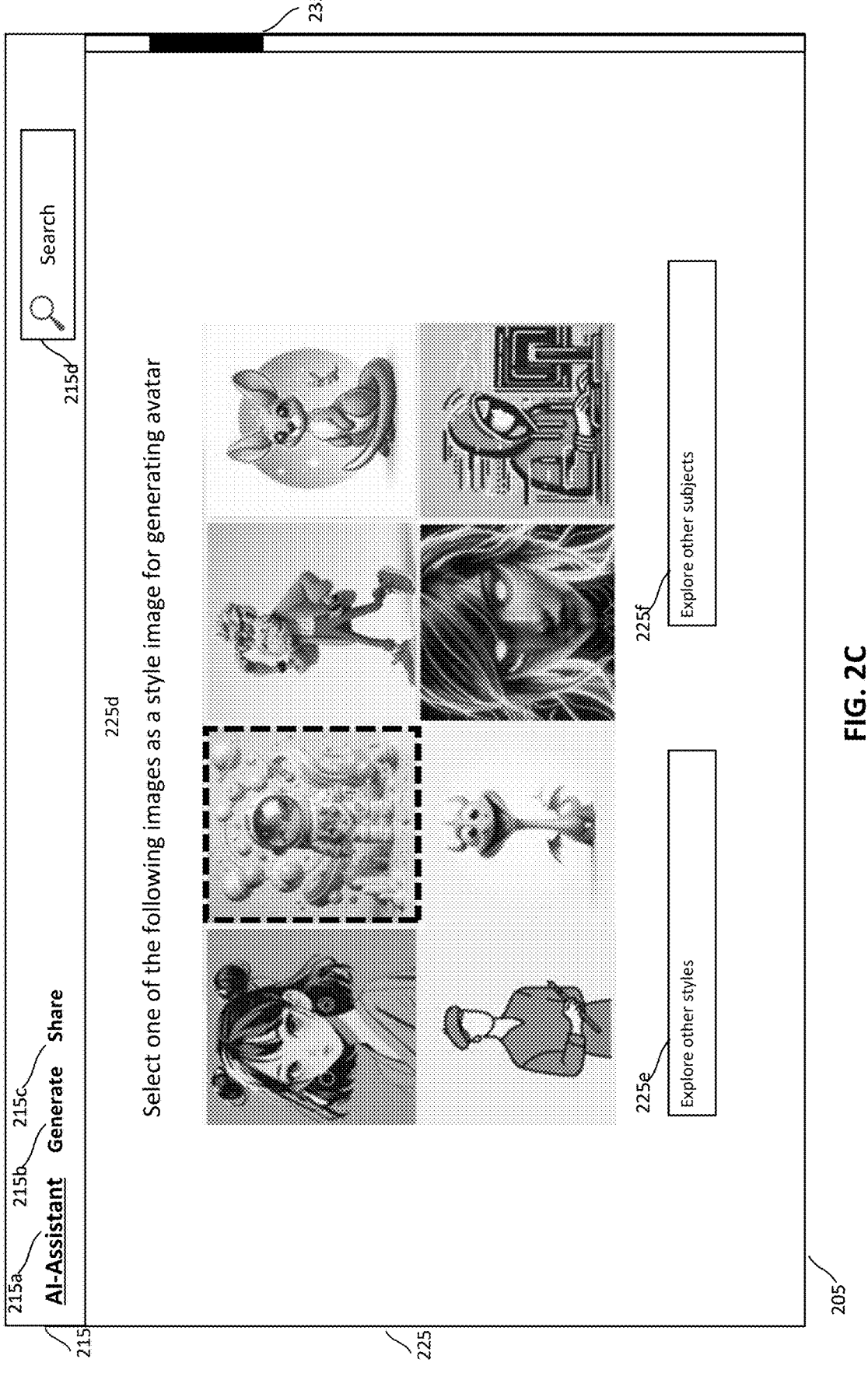
Figure 2D:
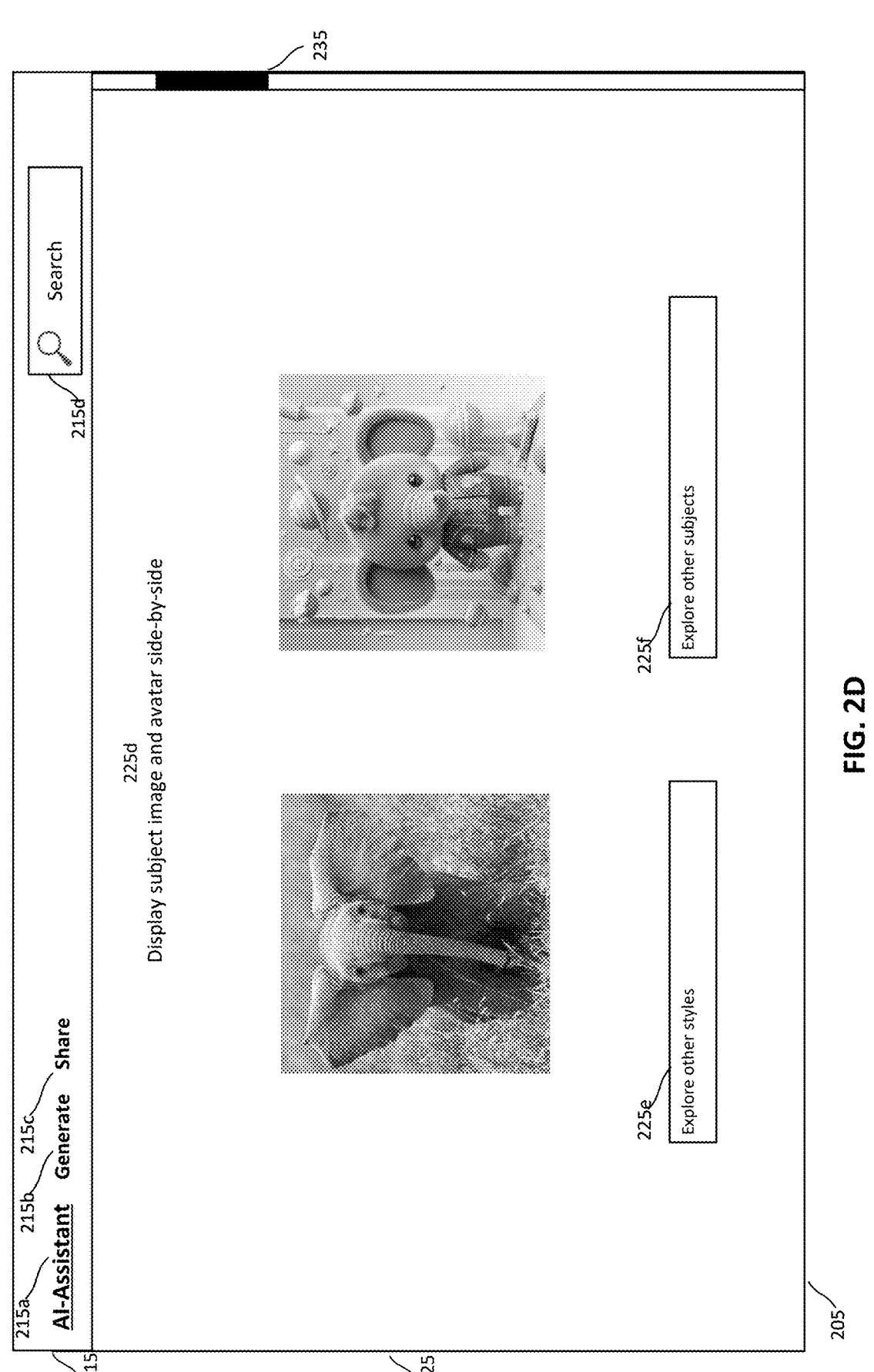

FIG. 2D continues from FIG. 2C upon a selection of one style image (e.g., a colorful image of an astronaut with planets and the milky way) in the field 225e while maintaining the same subject. In this example, the chat pane 225 shows the prompt enter box 225d with an instruction of "Display subject image and avatar side-by-side" and the respective subject image and the avatar underneath.

Figure 2E:
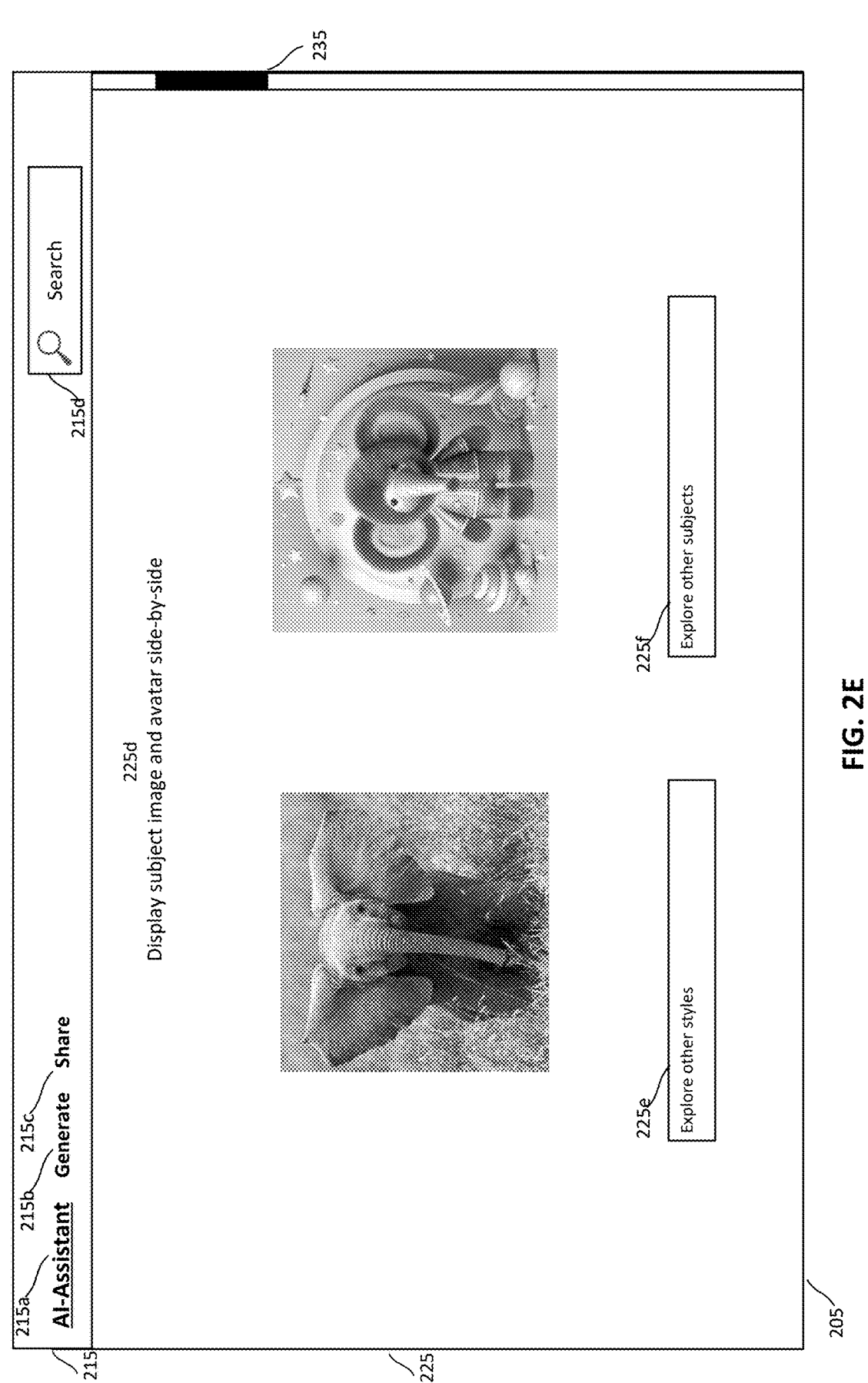

FIG. 2E continues from FIG. 2D upon a user feedback of rejecting the avatar in FIG. 2D while maintaining the same subject. In this example, the chat pane 225 shows the same subject image and another avatar with a higher similarity to the subject, e.g., a subject feature preservation score. In one embodiment, the system can directly invite the user to adjust the avatar by entering a subject feature preservation score and/or a creativity score. For instance, the creativity score is factored into the Dalle prompt and/or tied to an AI temperature parameter. As such, the user can control how closely an avatar resembles the user. For example, the user may want the avatar at a workplace resembling the user very closely, while the avatar at a gaming platform remotely resembling the user yet with a personal/creative touch, to maintain a balance between a sense of identity and preserving the user's privacy and personal boundaries in different context.

In one embodiment, the application can retrieve user image preferences data from the user database 128, and adjusts the rejected avatar based on the user image preferences data. In other implementations, the application adjusts the rejected avatar based on specific user feedback with details, such as subject/background/object size too big/small, resolution too high/low, colors too bright/dark, subject similarity too high/low, style similarity too high/low (e.g., a style preservation score), and the like. Absence of such specific user feedback details, the application can automatically generate a plurality of avatar variations based on factors similar to the specific details, for user selection.

In some implementations, the system provides a feedback loop by augmenting thumbs up and thumbs down buttons for each visual content output in the user interface 205. If the user dislikes a visual content output, the system can ask why and use the user feedback data to improve the generative model(s) 126. A thumbs down click could also prompt the user to indicate whether the visual content output was too bright, too dark, too big, too small, or was assigned the wrong subject/style/object, or the like.

The first generative model (e.g., the LMM 126a) can be any generative model trained to generate textual content describing visual prompts with details/nuances and accuracy. For instance, the first generative model may be GPT-4V, Imagen, Contrastive Language-Image Pretraining (CLIP), Flamingo, Perceiver, Multitask Unified Model (MUM), or the like.

The second generative model (e.g., the LVM 126b) can be any text-to-image model trained to generate visual content (e.g., image, video, and the like) applying style(s) on subject(s) seamlessly in response to textual prompts. For instance, the second generative model may be CLIP, Vision Transformer (ViT), Megatron-Turing NLG, DALL-E, Imagen, GauGAN2, VQGAN+CLIP, or the like. In some implementations, the system may select a text-to-image model based on factors such as open source, photorealistic, creative control, computational requirements, case of use, licensing, and the like. The less sophisticated a text-to-image model, the more meta prompting and/or additional tools/models are required to provide the same quality avatars. In one embodiment, the first and second generative models are embodied in one generative model.

In one embodiment, the style images are saved in a visual content library 142 as a new style image for users to select to apply new styles on new subject(s). Other implementations may utilize other models or other generative models to generate an avatar with desired style(s) based on considerations of open source, photorealistic, creative control, computational requirements, case of use, licensing, and the like. The generative model(s) 126 may be included as part of the application services platform 110 or they may be external models that are called by the application services platform 110. In implementations where other models in addition to the generative model(s) 126 are utilized, those models may be included as part of the application services platform 110 or they may be external models that are called by the application services platform 110.

The request processing unit 122 also coordinates communication and exchange of data among components of the application services platform 110 as discussed in the examples which follow. The request processing unit 122 receives a user request to generate an avatar with desired style(s) from the native application 114 or the browser application 112.

Figure 3:
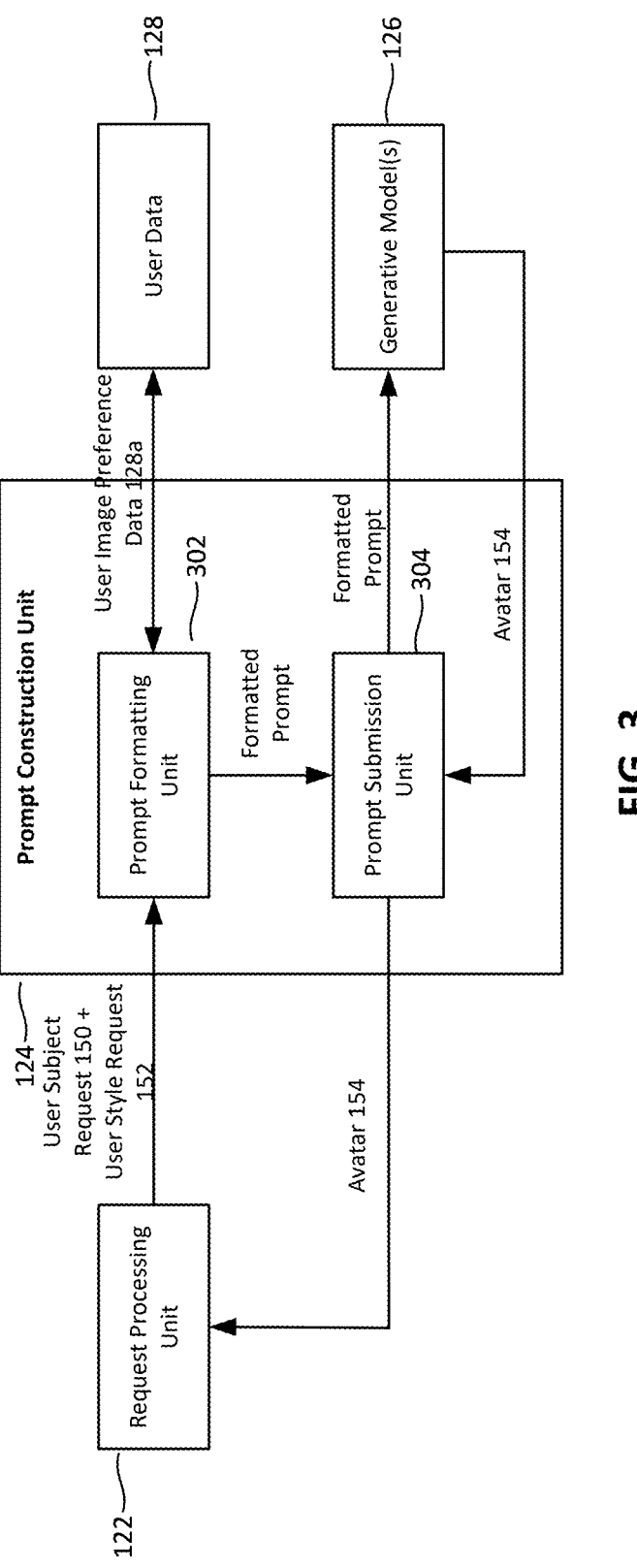
FIG. 3 is a diagram showing additional features of a prompt construction unit of the application services platform shown in FIG. 1A.

FIG. 3 is a diagram showing additional features of the prompt construction unit 124 of the application services platform shown in FIG. 1A. The prompt construction unit 124 formats and submits the prompt for the generative model(s) 126. The prompt construction unit 124 includes a prompt formatting unit 302 and a prompt submission unit 304.

The prompt formatting unit 302 receives a user subject request (including subject image(s)) and a style request from the request processing unit 122, then generates a subject meta prompt and a style meta prompt respectively for the LMM 126a. The LMM 126a generates a subject textual description of the subject image(s) using the subject meta prompt and a style textual description of the style request using the style meta prompt respectively, and then rewrites the textual descriptions into a textual prompt for the LVM 126b to generate an avatar with the desired style (e.g., the avatar with flat design style 154a in FIG. 1B).

The prompt construction unit 124 may reformat or otherwise standardize any information to be included in the prompt to a standardized format that is recognized by the generative model(s) 126. The generative model(s) 126 is trained using training data in this standardized format, in some implementations, and utilizing this format for the prompts provided to the generative model(s) 126 may improve the output quality provided by the generative model(s) 126.

Some common formats recognized by a LMM include JPEG (Joint Photographic Experts Group), PNG (Portable Network Graphics, TIFF (Tagged Image File Format), BMP (Bitmap Image File), GIF (Graphics Interchange Format), PSD (Photoshop Document), RAW, SVG (Scalable Vector Graphics), WEBP, OpenEXR, or the like.

The textual prompt (e.g., the meta prompt in Table 3) can include instructions that guide the LVM 126b to generate an avatar with desired style(s), and an optional background with object(s) if the user adda an object request. The system can instruct the generative model(s) 126 to generate a single-shot prompt (i.e., including a single example or instruction to guide the LMM's response) or a multi-shot prompt (i.e., including multiple examples or instructions to give the LMM more context and improve its understanding of the task) for generating the avatar.

In some implementations, when the user data (e.g., user preference data 128a) from the user database 128 is already in the format directly processable by the generative model(s)

126, the prompt construction unit 124 does not need to convert the user data. In other implementations, when the user data is not in the format directly processible by the generative model(s) 126, the prompt construction unit 124 converts the user data to the format directly processible by the generative model(s) 126. Some common standardized formats recognized by a language model include plain text, HTML, JSON, XML, and the like. In one embodiment, the system converts user data into JSON, which is a lightweight and efficient data-interchange format.

For instance, the prompt construction unit 124 can convert the user data (e.g., user image preferences 128a) to a format directly processible by the LMM 126a, for example, for adjusting the avatar 154 rejected by the user. As such, the user data, e.g., the user image preference data, can be considered in adjusting the avatar 154 rejected by the user, such as bigger/smaller subject/background/object size, higher/lower resolution, brighter/darker colors, higher/lower subject similarity, higher/lower style similarity, and the like as discussed. Other implementations may include instructions in addition to and/or instead of one or more of these instructions. Furthermore, the specific format of the prompt may differ in other implementations.

In some implementations, the application services platform 110 includes moderation services that analyze user request(s)/prompt(s), content generated by the generative model(s) 126, and/or the user data obtained from the user database 128, to ensure that potentially objectionable or offensive content is not generated or utilized by the application services platform 110.

If potentially objectionable or offensive content is detected in the user data obtained from the user database 128, the moderation services provides a blocked content notification to the client device 105 indicating that the prompt(s), the user data is blocked from forming the meta prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative model(s) 126 as an input.

In one embodiment, the prompt submission unit 304 submits the prompt(s), and/or the meta prompt(s) to the moderation services to ensure that the prompt does not include any potentially objectionable or offensive content. The prompt formatting unit 302 halts the processing of the user prompt(s), and/or the meta prompt(s) in response to the moderation services determining that the user prompt(s) and/or the visual content data includes potentially objectionable or offensive content. The image processing unit 130 may include an OCR tool to identify and remove text element(s) from subject/style images. In some implementations, the OCR tool store the text element(s) in editable characters for potential use. The image processing unit 130 can access the user database 128 for user input image data for pre-processing, such as identifying and removing textual elements. With the original text removed, the system can regenerate new text based on the user prompt, without the typographical errors and/or objectionable content, then provide the avatar with the new text to the client device 105.

The prompt submission unit 304 submits the textual prompt to the LVM 126b. The LVM 126b analyzes the textual prompt and generates avatars based on the textual prompt. The prompt submission unit 304 submits the avatars generated by the LVM 126b to the moderation services to ensure that the avatar(s) does not include any potentially objectionable or offensive content. The prompt formatting unit 302 can halt the processing of the avatars in response to the moderation services determining that the graphic design includes potentially objectionable or offensive content. The moderation services generates a blocked content notification in response to determining that the avatar(s) includes poten- tially objectionable or offensive content, and the notification is provided to the prompt formatting unit 302. The prompt formatting unit 302 may attempt to revise and resubmit the textual prompt. If the moderation services does not identify any issues with the avatar(s), the prompt submission unit 304 provides the avatar(s) to the request processing unit 122. The request processing unit 122 provides the avatar(s) to the native application 114 or the browser application 112 depending upon which application was the source of the visual content request. A technical benefit of this approach is that the moderation services provides safeguards against both user-created and model-created content to ensure that prohibited offensive or potentially offensive content is not presented to the user in the native application 114 or the browser application 112.

The user database 128 can be implemented on the appli- cation services platform 110 in some implementations. In other implementations, at least a portion of the user database 128 are implemented on an external server that is accessible by the prompt construction unit 124.

In some implementations, the application services plat- form 110 complies with privacy guidelines and regulations that apply to the usage of the user data included in the user database 128 to ensure that users have control over how the application services platform 110 utilizes their data. The user is provided with an opportunity to opt into the application services platform 110 to allow the application services platform 110 to access the user data and enable the genera- tive model(s) 126 to generate avatars according to the user's desired style/objects. In some implementations, the first time that an application, such as the native application 114 or the browser application 112 presents an AI assistant to the user, the user is presented with a message that indicates that the user may opt into allowing the application services platform 110 to access user data included in the user database 128 to support the visual style transfer to avatar functionality. The user may opt into allowing the application services platform 110 to access all or a subset of user data included in the user database 128. Furthermore, the user may modify their opt-in status at any time by accessing their user data and selectively opting into or opting out of allowing the application services platform 110 from accessing and utilizing user data from the user database 128 as a whole or individually.

In one embodiment, metadata can be generated for the avatar 154 to facilitate later retrieval based on a user query. For example, the metadata might detail that avatar 154 is related to a Christmas-themed flat design style, a birthday cake, and balloons. Consequently, the same user's query related to a birthday cake can be matched to the avatar 154 using the metadata.

Given an existing style images and a user content request, the system can accurately vary the style and/or object(s) for modifying the avatar 154. With these features, the system unlocks the possibility for expanding avatars in various styles with complex details matching the subject.

In some implementations, the user may submit further requests for additional avatar(s) to be generated and/or to further refine the avatar(s) that has already been generated. The request processing unit 122 can store the style and/or the object data included in the avatar(s) for the duration of a user session in which the user uses the native application 114 or the browser application 112. A technical benefit of this approach is that the style element data do not need to be retrieved each time that the user submits a prompt to generate avatar(s). The request processing unit 122 main- tains user session information in a persistent memory of the application services platform 110 and retrieves the style element data from the user session information in response to each subsequent prompt submitted by the user. The request processing unit 122 then provides the newly received user prompt(s) and the style element data to the prompt construction unit 124 or the LMM 126a to construct the textual prompt as discussed in the preceding examples.

The above-discussed visual content library 142 (storing e.g., subjects, styles, objects, backgrounds, or the like), request, prompts and responses 144, extracted/inferred user data 146 (e.g., user preferences), and other asset data 148 can be stored in the enterprise data storage 140. The extracted/inferred user data 146 (e.g., activities, preferences, or the like) is tentatively linked with a user ID during a user session and saved in a cache. After the user session, extracted/inferred user data 146 is de-linked form the user ID as metadata of the resulted new style image(s) and saved in the visual content library 142. In addition, the extracted/ inferred user data 146 linked with the user ID is saved back to the user database 128.

The enterprise data storage 140 can be physical and/or virtual, depending on the entity's needs and IT infrastruc- ture. Examples of physical enterprise data storage systems include network-attached storage (NAS), storage area net- work (SAN), direct-attached storage (DAS), tape libraries, hybrid storage arrays, object storage, and the like. Examples of virtual enterprise data storage systems include virtual SAN (vSAN), software-defined storage (SDS), cloud stor- age, hyper-converged Infrastructure (HCI), network virtual- ization and software-defined networking (SDN), container storage, and the like.

Figure 6:
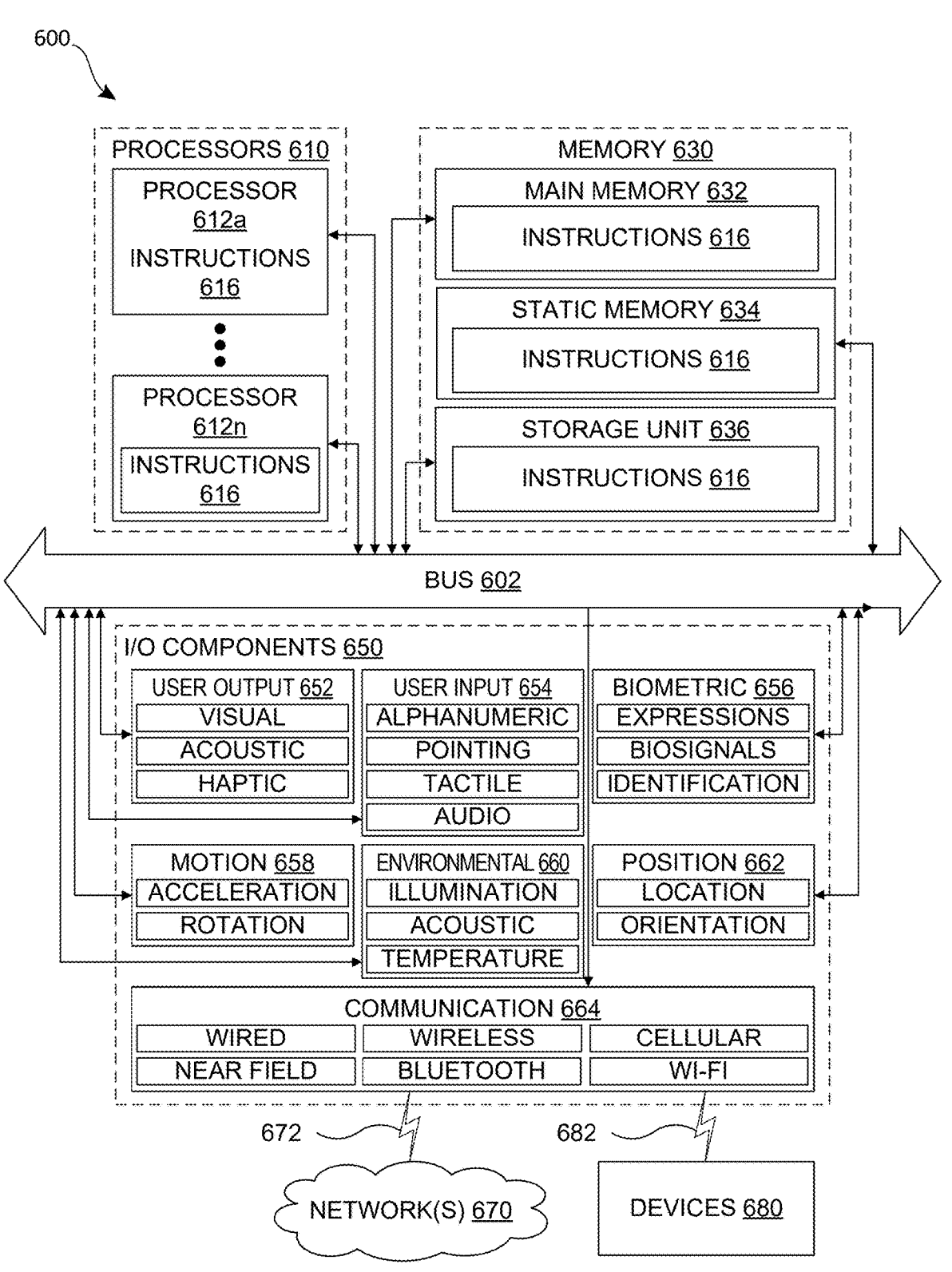
FIG. 6 is a block diagram showing components of an example machine configured to read instructions from a machine-readable medium and perform any of the features described herein.

FIG. 4 is a flow chart of an example process 400 for AI-based visual style transfer to avatar via automatically describing a subject image and a user style request in a text prompt according to the techniques disclosed herein. The process 400 can be implemented by the application services platform 110 or its components shown in the preceding examples. The process 400 may be implemented in, for instance, the example machine including a processor and a memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is con- templated that various embodiments of the process 400 may be performed in any order or combination and need not include all the illustrated steps.

In one embodiment, for example, in step 402, the request processing unit 122 receives, via a user interface (e.g., the user interface 205) of a client device (e.g., the client device 105), a style request (e.g., the user style request 152 in FIGS. 1B-1D) and at least one image (e.g., the subject image 150a in FIGS. 1B-1D) of at least one subject (e.g., a person, a cat, and the like) for generating an avatar (e.g., the human/cat avatar 154 in FIGS. 1B-1D, the baby elephant avatar in FIGS. 2D-2E, or the like) for the at least one subject. For example, the style request includes a style image (e.g., the style image 152b in FIG. 1B, the colorful image of an astronaut with planets and the milky way in FIG. 2C, or the like), and the style image is a photo, a diagram, a chart, an image, an infographic, a video, an animation, a screenshot, a meme, a slide deck, a pictogram, an ideogram, or a software application background.

In step 404, the prompt construction unit 124 constructs a first prompt by appending the style request (e.g., the user style request 152 in FIGS. 1B-1D) and the at least one image (e.g., the subject image 150a in FIGS. 1B-1D) of the at least one subject to a first instruction string (e.g., the combined meta prompt in Table 4), the first instruction string including instructions to a multimodal model (e.g., the LMM 126*a*) to generate a textual description of the at least one subject from the at least one image of the at least one subject, to generate a textual description of a style from the style image (e.g., the colorful image of an astronaut with planets and the milky way in FIG. 2C), and to construct a second prompt (e.g., a DALL•E prompt) including instructions to a text-to-image model (e.g., the LVM 126*b*) to create the avatar for the at least one subject in the style based on the textual descriptions.

In some implementations, the first instruction string further comprises instructions to the multimodal model (e.g., the LMM 126*a*) to identify the at least one subject (e.g., a person) among a plurality of objects (e.g., people, tables, chairs, a dish, windows, shutters, and the like in a restaurant) depicted in the at least one subject image based on a size threshold (e.g., 25% of the photo). As such, the LMM 126*a* filters away small objects, and only process main subject(s) in the at least one subject image. In other embodiment, the LMM 126*a* filters away small objects based on one or more other criteria, such as perspective, color palette, lighting and shadows, texture and material, mood and atmosphere, context and background of the image, and only process main subject(s) meeting the one or more other criteria. For example, a pet owner can single out his or her pet in a competition awarding photo based on the colors of the pet, while filtering away other pets in the same photo.

In some implementations, when there are more than one subject, the first instruction string further comprises instructions to the text-to-image model (e.g., the LVM 126*b*) to present each of the subjects in the avatar based on a relative size of each of the subjects in the same photo or in their respective photos. Referring back to FIG. 1C, the person in the subject image 150*a* and the cat in the subject image 150*c* are presented in the avatar with Christmas theme flat design style 154*c* based on a relative size of each of the subjects in their respective photos.

In step 406, the prompt construction unit 124 provides as an input the first prompt to the multimodal model (e.g., the LMM 126*a*) and receiving as an output the second prompt (e.g., a DALL•E prompt) from the multimodal model.

In step 408, the prompt construction unit 124 provides as an input the second prompt (e.g., a DALL•E prompt) to the text-to-image model (e.g., the LVM 126*b*) and receiving as an output the avatar from the text-to-image model.

In step 410, the request processing unit 122 provides the avatar to the client device (e.g., the client device 105). In step 412, the request processing unit 122 causes the user interface (e.g., the user interface 205) of the client device (e.g., the client device 105) to display the avatar.

In another embodiment, the style request (e.g., the user style request 152) further includes at least one textual content item (e.g., the user style request text 152*a*), the prompt construction unit (e.g., the prompt construction unit 124) further appends the at least one textual content item (e.g., the user style request text 152*a*) to the first instruction string, and the instructions to the text-to-image model (e.g., the LVM 126*b*) further include to create the avatar further based on the at least one textual content item (e.g., the user style request text 152*a*).

In yet another embodiment, the request processing unit 122 receives, via the user interface (e.g., the user interface 205) of the client device (e.g., the client device 105), an object request (e.g., the user object request 153 in FIGS. 1B-1D) for generating a background of the avatar, the background including at least one object (e.g., a birthday cake and balloons in FIGS. 1B-1D), the prompt construction unit (e.g., the prompt construction unit 124) further appends the object request to the first instruction string, the first instruction string further comprises instructions to the multimodal model (e.g., the LMM 126*a*) to generate a textual description of the object request when the object request is not textual, and the instructions to the text-to-image model (e.g., the LVM 126*b*) further include to create the background based on the textual description of the object request.

In some implementations, the request processing unit 122 receives at least one user feedback (e.g., user rejection of the avatar in FIG. 2D) on the avatar via the user interface (e.g., the user interface 205). For example, the user feedback is collected via a user selection of at least one of a thumbs-up tab, a thumbs-down tab, a neutral tab, or a generating-more-image tab, a textual input, or a combination thereof.

The prompt construction unit 124 constructs a third prompt by appending the feedback and the avatar to a third instruction string, the third instruction string including instructions to the text-to-image model (e.g., the LVM 126*b*) to generate at least another avatar based on the feedback (e.g., the user rejection of the baby elephant avatar in FIG. 2D) and the avatar (e.g., the baby elephant avatar in FIG. 2D), and to input the third prompt into the text-to-image model (e.g., the LVM 126*b*) to generate the at least another avatar (e.g., the baby elephant avatar in FIG. 2E) by adjusting one or more visual elements of the avatar (e.g., a higher similarity to the baby elephant image in FIG. 2D) based on the feedback while preserving the at least one subject (e.g., the baby elephant) in the style (e.g., the style of the selected colorful image of an astronaut with planets and the milky way in FIG. 2C).

The request processing unit 122 provides the at least another avatar (e.g., the baby elephant avatar in FIG. 2E) to the client device; and causes the user interface (e.g., the user interface 205) of the client device (e.g., the client device 105) to display the at least another avatar (e.g., the baby elephant avatar in FIG. 2E). For example, the one or more visual elements of the avatar include a visual similarity of the at least another avatar to the at least one subject (e.g., the baby elephant), the style (e.g., the style of the selected colorful image of an astronaut with planets and the milky way in FIG. 2C), or a combination thereof.

In one embodiment, the request processing unit 122 stores the textual description of the at least one subject (e.g., the person in the subject image 150*a* in FIG. 1B) in a subject profile (e.g., a user profile), when the subject signs up for a platform (e.g., a web-based collaborative platform, a social media platform, a gaming platform, or the like) or application (e.g., Microsoft Designer®, a team collaboration application, or the like), or when the subject activates the platform or application. The request processing unit 122 then applies the subject profile to at least one function (e.g., emails, chat and video conferencing, file-sharing, or the like) of the platform or application other than avatar creation.

The system allows users to upload images as subject/style prompts thus simplifying the creative process for the users. This case of use increases user productivity and utilization, as well as attracts more non-technical users. By automating the style transfer on avatar process, the system eliminates reliance on user-manually-generated subject/style prompts. This solution significantly lowers the barrier to create high-quality, stylized avatars, and makes the avatar creation process more efficient and open. The system can apply the style transfer to avatars of a range of visual content types, including images, images with text, videos, animations, or the like, thereby enhancing the versatility of an avatar creation platform/application.

In another embodiment, the request processing unit 122 or the prompt construction unit 124 performs content moderation on the avatar(s) before providing the avatar(s) to the client device (e.g., the client device 105). After the content moderation, the request processing unit 122 or the prompt construction unit 124 adds the avatar(s) as an additional style image(s) in a visual content library (e.g., the visual content library 142). In addition, the request processing unit

122 or the prompt construction unit 124 adds metadata associated with the avatar(s) in the visual content library, and the metadata comprises at least one of the subject (e.g., the baby elephant), the style (e.g., the style of the selected colorful image of an astronaut with planets and the milky way in FIG. 2C), the object(s) (e.g., the birthday cake) of the background, and the like.

In some implementations, the system can share the avatar(s) immediately, so that the user can celebrate the relevant event (e.g., the user's birthday). Moreover, avatars can be a fun and creative way for individuals to add a personal touch to their profile picture, invitations, cards, and other graphic designs. By creating an avatar that reflects their appearance and personality, individuals can create a unique and memorable design that stands out from traditional invitations and cards. For example, individuals might create avatars of themselves and their loved ones to include on wedding invitations, birthday cards, or holiday greetings.

In other implementations, the system can start a new AI chat to help the user to plan events by suggesting an action plan with steps. For example, when the user organizes a birthday party, this would often involve setting a budget, creating a guest list, planning the food and drinks, arranging entertainment, reserving and then decorating the venue, and the like. In other implementations, the system can perform the actions of the event on behalf of the user, such as setting the budget for the birthday party, reserving the venue, and the like.

Therefore, the system provides visual content style transfer on avatar to match with user selected subject(s) and style(s), without manually crafting detailed language prompts. The system personalizes the avatar(s) for the user. In addition, the system can modify the avatar(s) by adjusting the avatar(s) based on user feedback(s).

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In one embodiment, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model(s) 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model(s) 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data (especially user data) is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
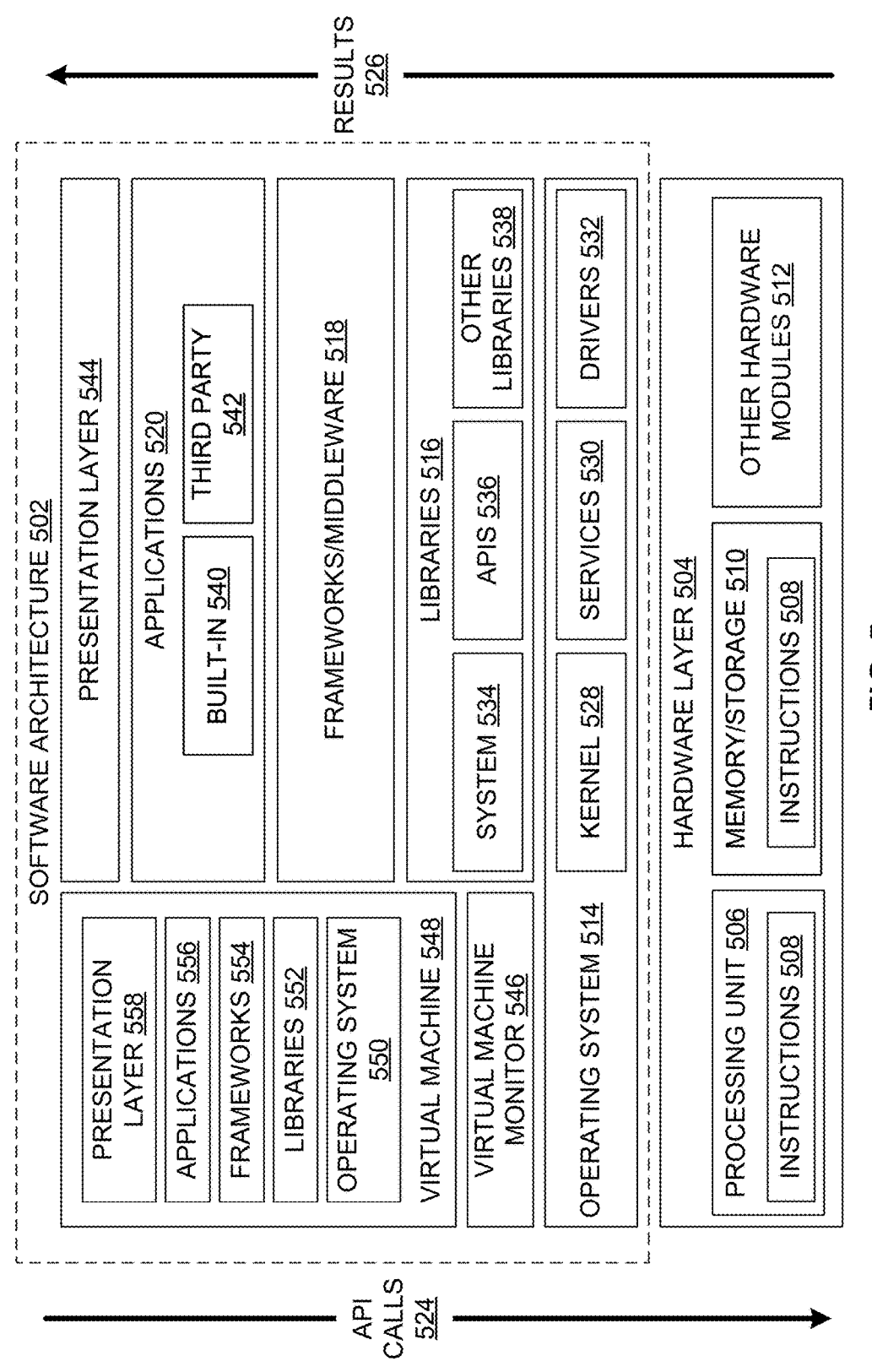
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor, and a machine-readable storage medium storing executable instructions which, when executed by the processor, cause the processor alone or in combination with other processors to perform the following operations:

receiving, via a user interface of a client device, a style request and at least one image of at least one subject for generating an avatar that captures one or more visual elements sufficiently identifying the at least one subject, the style request including a style image that captures one or more visual elements reflecting a style, and the at least one image being camera-captured;

constructing, via a prompt construction unit, a first prompt by appending the style request and the at least one image of the at least one subject to a first instruction string, the first instruction string including instructions to a multimodal model to generate a textual description of the at least one subject from the at least one image of the at least one subject, to generate a textual description of a style from the style image, and to construct a second prompt including instructions to a text-to-image model to create the avatar for the at least one subject in the style based on the textual descriptions;

providing as an input the first prompt to the multimodal model and receiving as an output the second prompt from the multimodal model;

providing as an input the second prompt to the text-to-image model and receiving as an output the avatar from the text-to-image model;

providing the avatar to the client device; and causing the user interface of the client device to display the avatar.

2. The data processing system of claim 1, wherein the first instruction string further comprises instructions to the multimodal model to identify the at least one subject among a plurality of objects depicted in the at least one subject image based on a size threshold, wherein the one or more visual elements sufficiently identifying the at least one subject include at least one of gender, skin tone, age, or race of the at least one subject, and wherein the one or more visual elements reflecting the style include at least one of layout, color, typography, whitespace, texture, or scale.

3. The data processing system of claim 2, wherein the first instruction string further comprises instructions to the text-to-image model to present each of the at least one subject in the avatar based on a relative size of the each of the at least one subject.

4. The data processing system of claim 1, wherein the style request further includes at least one textual content item, wherein the prompt construction unit further appends the at least one textual content item to the first instruction string, and wherein the instructions to the text-to-image model further include to create the avatar further based on the at least one textual content item.

5. The data processing system of claim 1, wherein the machine-readable storage medium further includes instructions configured to cause the processor alone or in combination with other processors to perform operations of:

receiving, via the user interface of the client device, an object request for generating a background of the avatar, the background including at least one object, wherein the prompt construction unit further appends the object request to the first instruction string, wherein the first instruction string further comprises instructions to the multimodal model to generate a textual description of the object request when the object request is not textual, and wherein the instructions to the text-to-image model further include to create the background based on the textual description of the object request.

6. The data processing system of claim 1, wherein the machine-readable storage medium further includes instructions configured to cause the processor alone or in combination with other processors to perform operations of:

receiving at least one user feedback on the avatar via the user interface.

7. The data processing system of claim 6, wherein the machine-readable storage medium further includes instructions configured to cause the processor alone or in combination with other processors to perform operations of:

constructing, via the prompt construction unit, a third prompt by appending the feedback and the avatar to a third instruction string, the third instruction string including instructions to the text-to-image model to generate at least another avatar based on the feedback and the avatar, and to input the third prompt into the text-to-image model to generate the at least another avatar by adjusting one or more visual elements of the avatar based on the feedback while preserving the at least one subject in the style.

8. The data processing system of claim 7, wherein the machine-readable storage medium further includes instructions configured to cause the processor alone or in combination with other processors to perform operations of:

providing the at least another avatar to the client device; and causing the user interface of the client device to display the at least another avatar, wherein the one or more visual elements of the avatar include a visual similarity of the at least another avatar to the at least one subject, the style, or a combination thereof.

9. The data processing system of claim 6, wherein the user feedback is collected via a user selection of at least one of a thumbs-up tab, a thumbs-down tab, a neutral tab, or a generating-more-image tab, a textual input, or a combination thereof.

10. The data processing system of claim 1, wherein the machine-readable storage medium further includes instructions configured to cause the processor alone or in combination with other processors to perform operations of:

storing the textual description of the at least one subject in a subject profile, when the subject signs up for a platform or application, or when the subject activates the platform or application.

11. The data processing system of claim 10, wherein the machine-readable storage medium further includes instructions configured to cause the processor alone or in combination with other processors to perform operations of:

applying the subject profile to at least one function of the platform or application other than avatar creation.

12. The data processing system of claim 1, wherein the style image is a photo, a diagram, a chart, an image, an infographic, a video, an animation, a screenshot, a meme, a slide deck, a pictogram, an ideogram, or a software application background.

13. A method comprising:

receiving, via a user interface of a client device, a style request and at least one image of at least one subject for generating an avatar that captures one or more visual elements sufficiently identifying the at least one subject, the style request including a style image that captures one or more visual elements reflecting a style, and the at least one image being camera-captured;

constructing, via a prompt construction unit, a first prompt by appending the style request and the at least one image of the at least one subject to a first instruction string, the first instruction string including instructions to a multimodal model to generate a textual description of the at least one subject from the at least one image of the at least one subject, to generate a textual description of a style from the style image, and to construct a second prompt including instructions to a text-to-image model to create the avatar for the at least one subject in the style based on the textual descriptions;

providing as an input the first prompt to the multimodal model and receiving as an output the second prompt from the multimodal model;

providing as an input the second prompt to the text-to-image model and receiving as an output the avatar from the text-to-image model;

providing the avatar to the client device; and causing the user interface of the client device to display the avatar.

14. The method of claim 13, wherein the first instruction string further comprises instructions to the multimodal model to identify the at least one subject among a plurality of objects depicted in the at least one subject image based on a size threshold.

15. The method of claim 14, wherein the first instruction string further comprises instructions to the text-to-image model to present each of the at least one subject in the avatar based on a relative size of the each of the at least one subject.

16. The method of claim 13, wherein the style request further includes at least one textual content item, wherein the prompt construction unit further appends the at least one textual content item to the first instruction string, and wherein the instructions to the text-to-image model further include to create the avatar further based on the at least one textual content item.

17. A non-transitory computer readable medium on which are stored instructions that, when executed, cause a programmable device to perform functions of:

receiving, via a user interface of a client device, a style request and at least one image of at least one subject for generating an avatar that captures one or more visual elements sufficiently identifying the at least one subject, the style request including a style image that captures one or more visual elements reflecting a style, and the at least one image being camera-captured;

constructing, via a prompt construction unit, a first prompt by appending the style request and the at least one image of the at least one subject to a first instruction string, the first instruction string including instructions to a multimodal model to generate a textual description of the at least one subject from the at least one image of the at least one subject, to generate a textual description of a style from the style image, and to construct a second prompt including instructions to a text-to-image model to create the avatar for the at least one subject in the style based on the textual descriptions;

providing as an input the first prompt to the multimodal model and receiving as an output the second prompt from the multimodal model;

providing as an input the second prompt to the text-to-image model and receiving as an output the avatar from the text-to-image model;

providing the avatar to the client device; and causing the user interface of the client device to display the avatar.

18. The non-transitory computer readable medium of claim 17, wherein the first instruction string further comprises instructions to the multimodal model to identify the at least one subject among a plurality of objects depicted in the at least one subject image based on a size threshold.

19. The non-transitory computer readable medium of claim 18, wherein the first instruction string further comprises instructions to the text-to-image model to present each of the at least one subject in the avatar based on a relative size of the each of the at least one subject.

20. The non-transitory computer readable medium of claim 17, wherein the style request further includes at least one textual content item, wherein the prompt construction unit further appends the at least one textual content item to the first instruction string, and wherein the instructions to the text-to-image model further include to create the avatar further based on the at least one textual content item.

* * * * *